(12) United States Patent
Mattes et al.

(10) Patent No.: US 10,130,534 B2
(45) Date of Patent: *Nov. 20, 2018

(54) METHOD AND APPARATUS FOR AUTOMATED POSITIONING OF USER SUPPORT SURFACES IN POWER DRIVEN WHEELCHAIR

(71) Applicant: Invacare Corporation, Elyria, OH (US)

(72) Inventors: John Mattes, Columbia Station, OH (US); Bruce A. Jaenke, Parma, OH (US); Gary E. Chopcinski, North Ridgeville, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,649

(22) Filed: Dec. 16, 2016

(65) Prior Publication Data

US 2017/0252238 A1     Sep. 7, 2017

Related U.S. Application Data

(60) Continuation of application No. 14/802,221, filed on Jul. 17, 2015, now Pat. No. 9,522,091, which is a
(Continued)

(51) Int. Cl.
*A61G 5/00*     (2006.01)
*A61G 5/04*     (2013.01)
(Continued)

(52) U.S. Cl.
CPC ................. *A61G 5/10* (2013.01); *A61G 5/04* (2013.01); *A61G 5/1089* (2016.11); *A61G 5/128* (2016.11);
(Continued)

(58) Field of Classification Search
CPC ... A61G 5/00; A61G 5/04; A61G 5/10; A61G 5/1089; A61G 5/128; A61G 7/00; A61G 7/05784; G05B 19/00; G05B 19/106
See application file for complete search history.

(56) References Cited

U.S. PATENT DOCUMENTS

| 1,114,948 A | 10/1914 | Walker |
| 2,759,525 A | 8/1956 | Reis |

(Continued)

FOREIGN PATENT DOCUMENTS

| DE | 3923937 A1 | 1/1990 |
| DE | 3832844 A1 | 3/1990 |

(Continued)

OTHER PUBLICATIONS

US 8,538,599, 09/2013, Peters et al. (withdrawn)
(Continued)

*Primary Examiner* — Yonel Beaulieu
(74) *Attorney, Agent, or Firm* — Calfee, Halter & Griswold LLP

(57) ABSTRACT

By programming position parameters corresponding to user support surfaces of a power driven wheelchair, movement of the user support surfaces is automated. The user support surfaces can be positioned individually, as part of a sequence or as part of a series of sequences. Accordingly, with little effort, a user can position the user support surfaces of the wheelchair to a predefined position.

28 Claims, 16 Drawing Sheets

Related U.S. Application Data continuation of application No. 13/975,614, filed on Aug. 26, 2013, now Pat. No. 9,084,705, which is a continuation of application No. 13/646,989, filed on Oct. 8, 2012, now abandoned, which is a continuation of application No. 13/228,677, filed on Sep. 9, 2011, now Pat. No. 8,285,440, which is a division of application No. 11/513,750, filed on Aug. 31, 2006, now Pat. No. 8,073,585.

(60) Provisional application No. 60/712,987, filed on Aug. 31, 2015, provisional application No. 60/727,005, filed on Oct. 15, 2005, provisional application No. 60/726,983, filed on Oct. 15, 2005, provisional application No. 60/726,666, filed on Oct. 15, 2005, provisional application No. 60/726,981, filed on Oct. 15, 2005, provisional application No. 60/726,993, filed on Oct. 15, 2005, provisional application No. 60/727,249, filed on Oct. 15, 2005, provisional application No. 60/727,250, filed on Oct. 15, 2005.

(51) Int. Cl.
| | | |
|---|---|---|
| A61G 5/10 | (2006.01) | |
| G05B 19/10 | (2006.01) | |
| A61G 5/12 | (2006.01) | |
| H02P 21/18 | (2016.01) | |
| A61G 7/057 | (2006.01) | |

(52) U.S. Cl.
CPC ........ *A61G 7/05784* (2016.11); *G05B 19/106* (2013.01); *H02P 21/18* (2016.02); *A61G 5/1059* (2013.01); *A61G 5/1075* (2013.01); *A61G 5/12* (2013.01); *A61G 2203/14* (2013.01); *A61G 2203/20* (2013.01); *B60Y 2200/84* (2013.01); *G05B 2219/23128* (2013.01); *G05B 2219/23129* (2013.01); *G05B 2219/23159* (2013.01); *G05B 2219/23193* (2013.01); *G05B 2219/23332* (2013.01); *G05B 2219/23388* (2013.01); *G05B 2219/2637* (2013.01); *Y02T 10/643* (2013.01); *Y02T 10/7258* (2013.01)

(56) References Cited

U.S. PATENT DOCUMENTS

| | | | |
|---|---|---|---|
| 3,454,305 A | 7/1969 | Gilmour | |
| 4,207,959 A | 6/1980 | Youdin et al. | |
| 4,736,921 A | 4/1988 | Zane et al. | |
| 4,779,884 A | 10/1988 | Minati | |
| 4,951,766 A | 8/1990 | Basedow et al. | |
| 5,033,000 A | 7/1991 | Littlejohn et al. | |
| 5,157,768 A | 10/1992 | Hoeber et al. | |
| 5,187,797 A | 2/1993 | Nielsen et al. | |
| 5,197,559 A | 3/1993 | Garin et al. | |
| 5,234,066 A | 8/1993 | Ahsing et al. | |
| 5,245,558 A | 9/1993 | Hachey | |
| 5,248,007 A | 9/1993 | Watkins et al. | |
| 5,261,715 A | 11/1993 | Blatt et al. | |
| 5,299,824 A | 4/1994 | Roberts et al. | |
| 5,516,021 A | 5/1996 | Douglass | |
| 5,547,038 A | 8/1996 | Madwed | |
| 5,555,949 A | 9/1996 | Stallard et al. | |
| 5,647,520 A | 7/1997 | McDaid | |
| 5,701,965 A | 12/1997 | Kamen et al. | |
| 5,718,442 A | 2/1998 | Alexander et al. | |
| 5,794,730 A | 8/1998 | Kamen | |
| 5,817,137 A | 10/1998 | Kaemmerer | |
| 5,899,526 A | 5/1999 | LaPointe et al. | |
| 5,961,561 A | 10/1999 | Wakefield | |
| 6,068,280 A | 5/2000 | Torres | |
| 6,135,476 A | 10/2000 | Dickie et al. | |
| 6,138,970 A | 10/2000 | Sohrt et al. | |
| 6,152,246 A | 11/2000 | King et al. | |
| 6,154,690 A | 11/2000 | Coleman | |
| 6,170,598 B1 | 1/2001 | Furukawa | |
| 6,290,011 B1 | 9/2001 | Langaker et al. | |
| 6,354,390 B1 | 3/2002 | Uchiyama et al. | |
| 6,390,426 B1 | 5/2002 | Berry | |
| 6,409,265 B1 | 6/2002 | Koerlin et al. | |
| 6,425,635 B1 | 7/2002 | Pulver | |
| 6,588,792 B1 | 7/2003 | Koerlin et al. | |
| 6,688,571 B1 | 2/2004 | Pauls | |
| 6,715,784 B2 | 4/2004 | Koerlin et al. | |
| 6,816,762 B2 | 11/2004 | Hensey et al. | |
| 6,819,981 B2 | 11/2004 | Wakefield, II et al. | |
| 6,832,745 B2 | 12/2004 | Lindsay | |
| 6,866,107 B2 | 3/2005 | Heinzmann et al. | |
| 6,868,931 B2 | 3/2005 | Morrell et al. | |
| 6,871,122 B1 | 3/2005 | Wakefield, II | |
| 6,874,591 B2 | 4/2005 | Morrell et al. | |
| 6,926,106 B2 | 8/2005 | Richey, II et al. | |
| 6,938,923 B2 | 9/2005 | Mulhern et al. | |
| 6,842,692 B2 | 11/2005 | Fehr et al. | |
| 6,974,194 B2 | 12/2005 | Schreiber et al. | |
| 6,976,699 B2 | 12/2005 | Koerlin | |
| 6,989,642 B2 | 1/2006 | Wakefield, II et al. | |
| 6,991,292 B2 | 1/2006 | Kasten | |
| 7,003,381 B2 | 2/2006 | Wakefield, II | |
| 7,083,019 B2 | 8/2006 | Chiou et al. | |
| 7,113,854 B2 | 9/2006 | Mansell et al. | |
| 7,148,638 B2 | 12/2006 | Wakefield, II | |
| 7,159,181 B2 | 1/2007 | Mansell et al. | |
| 7,171,288 B2 | 1/2007 | Wakefield, II | |
| 7,246,856 B2 | 7/2007 | Kruse et al. | |
| 7,262,762 B2 | 8/2007 | McAlindon | |
| 7,296,312 B2 | 11/2007 | Menkedick et al. | |
| 7,310,776 B2 | 12/2007 | Mansell et al. | |
| 7,374,679 B2 | 5/2008 | Huang et al. | |
| 7,403,844 B2 | 7/2008 | Chopcinski et al. | |
| 7,461,897 B2 | 12/2008 | Kruse et al. | |
| 7,635,164 B2 | 12/2009 | Torres et al. | |
| 7,668,634 B2 | 2/2010 | Mansell et al. | |
| 8,127,875 B2 | 3/2011 | Mattes | |
| 8,065,051 B2 | 11/2011 | Chopcinski et al. | |
| 8,073,585 B2 | 12/2011 | Jaenke et al. | |
| 8,073,588 B2 | 12/2011 | Peters et al. | |
| 8,145,373 B2 | 3/2012 | Jaenke | |
| 8,285,440 B2 | 10/2012 | Jaenke | |
| 8,315,753 B2 | 11/2012 | Meyer | |
| 8,437,899 B2 | 5/2013 | Jaenke et al. | |
| 8,646,551 B2 | 2/2014 | Mattes | |
| 8,793,032 B2 | 7/2014 | Peters et al. | |
| 8,977,431 B2 | 3/2015 | Peters et al. | |
| 9,084,705 B2 * | 7/2015 | Jaenke | A61G 5/04 |
| 9,456,942 B2 * | 10/2016 | Peters | A61G 5/04 |
| 2002/0008718 A1 | 1/2002 | Obradovich | |
| 2002/0173993 A1 | 11/2002 | Skulason et al. | |
| 2003/0001875 A1 | 1/2003 | Black | |
| 2003/0090089 A1 | 5/2003 | Koerlin et al. | |
| 2003/0109973 A1 | 6/2003 | Hensey et al. | |
| 2003/0120601 A1 | 6/2003 | Ouye et al. | |
| 2003/0127261 A1 | 7/2003 | Borroni-Bird | |
| 2004/0002305 A1 | 1/2004 | Byman-Kivivuori et al. | |
| 2004/0004372 A1 | 1/2004 | Mullen et al. | |
| 2004/0006422 A1 | 1/2004 | Fehr | |
| 2004/0085295 A1 | 5/2004 | Cowen | |
| 2004/0094936 A1 | 5/2004 | Koerlin | |
| 2004/0195173 A1 | 10/2004 | Huang et al. | |
| 2004/0210351 A1 | 10/2004 | Wakefield, II et al. | |
| 2004/0227728 A1 | 11/2004 | McAlindon | |
| 2004/0252341 A1 | 12/2004 | Adachi et al. | |
| 2004/0259591 A1 | 12/2004 | Grams et al. | |
| 2005/0062726 A1 | 3/2005 | Marsden et al. | |
| 2005/0075758 A1 | 4/2005 | Wakefield, II | |
| 2005/0076308 A1 | 4/2005 | Mansell et al. | |
| 2005/0080518 A1 | 4/2005 | Wakefield | |
| 2005/0082995 A1 | 4/2005 | Wakefield, II et al. | |
| 2005/0107925 A1 | 5/2005 | Enigk et al. | |
| 2005/0195173 A1 | 9/2005 | McKay | |

(56) References Cited

U.S. PATENT DOCUMENTS

| | | |
|---|---|---|
| 2005/0236196 A1 | 10/2005 | Runkles |
| 2005/0236208 A1 | 10/2005 | Runkles et al. |
| 2005/0236217 A1 | 10/2005 | Koerlin et al. |
| 2006/0247836 A1 | 11/2006 | Mansell et al. |
| 2007/0050096 A1 | 3/2007 | Mattes et al. |
| 2007/0050111 A1 | 3/2007 | Mattes et al. |
| 2007/0055424 A1 | 3/2007 | Peters et al. |
| 2007/0056780 A1 | 3/2007 | Jaenke et al. |
| 2007/0056781 A1 | 3/2007 | Mattes et al. |
| 2007/0056782 A1 | 3/2007 | Chopcinski et al. |
| 2007/0067072 A1 | 3/2007 | Chopcinski et al. |
| 2007/0074917 A1 | 4/2007 | Jaenke et al. |
| 2007/0080003 A1 | 4/2007 | Koerlin et al. |
| 2007/0130522 A1 | 6/2007 | Mansell et al. |
| 2007/0262629 A1 | 11/2007 | Kruse et al. |
| 2008/0030463 A1 | 2/2008 | Forest |
| 2008/0097254 A1 | 4/2008 | Torres et al. |
| 2008/0249694 A1 | 10/2008 | Jaenke et al. |
| 2009/0121532 A1 | 5/2009 | Kruse et al. |
| 2009/0153370 A1 | 6/2009 | Cooper et al. |
| 2010/0082182 A1 | 4/2010 | Griggs et al. |
| 2012/0064502 A1 | 3/2012 | Chopcinski |
| 2012/0166020 A1 | 6/2012 | Mattes |
| 2014/0005852 A1 | 2/2014 | Jaenke |
| 2014/0067158 A1 | 3/2014 | Peters et al. |

FOREIGN PATENT DOCUMENTS

| | | |
|---|---|---|
| EP | 0345785 A2 | 12/1989 |
| EP | 0436103 A2 | 7/1991 |
| EP | 1148394 A2 | 10/1991 |
| GB | 2222701 A | 3/1990 |
| JP | 2008-194183 | 8/2008 |
| JP | 2009-078028 | 4/2009 |
| JP | 2009-261472 | 11/2009 |
| JP | 2010-017354 | 1/2010 |
| WO | 2003034967 A2 | 5/2003 |
| WO | 2004036390 | 4/2004 |
| WO | 2005037168 A1 | 1/2005 |
| WO | 2005032924 A2 | 4/2005 |
| WO | 2005038542 A2 | 4/2005 |
| WO | 2005039473 A2 | 5/2005 |
| WO | 2005039930 A2 | 5/2005 |
| WO | 2007027845 A2 | 3/2007 |
| WO | 2007027846 A2 | 3/2007 |
| WO | 2007027851 A2 | 3/2007 |
| WO | 2007027852 A2 | 3/2007 |
| WO | 2007027853 A2 | 3/2007 |
| WO | 2007027857 A2 | 3/2007 |
| WO | 2007027872 A2 | 3/2007 |
| WO | 2007027971 A2 | 3/2007 |

OTHER PUBLICATIONS

Response to Office action from U.S. Appl. No. 11/513,746 dated Oct. 27, 2008.
Office action from U.S. Appl. No. 11/513,746 dated Jan. 15, 2009.
Office action from U.S. Appl. No. 11/513,802 dated Aug. 7, 2009.
Response from U.S. Appl. No. 11/513,802 dated Dec. 3, 2009.
Office action from U.S. Appl. No. 11/513,802 dated Mar. 19, 2010.
Response from U.S. Appl. No. 11/513,802 dated Aug. 19, 2010.
Office action from U.S. Appl. No. 11/513,802 dated Oct. 6, 2010.
Response from U.S. Appl. No. 11/513,802 dated Feb. 4, 2011.
Office action from U.S. Appl. No. 11/513,802 dated Apr. 14, 2011.
Response from U.S. Appl. No. 11/513,802 dated Jul. 14, 2011.
Notice of Allowance from U.S. Appl. No. 11/513,802 dated Aug. 25, 2011.
Notice of Allowance from U.S. Appl. No. 11/513,802 dated Oct. 3, 2011.
Office action from U.S. Appl. No. 11/513,750 dated Nov. 23, 2009.
Response from U.S. Appl. No. 11/513,750 dated May 21, 2010.
Notice of Allowance from U.S. Appl. No. 11/513,750 dated Dec. 2, 2010.
Notice of Allowance from U.S. Appl. No. 11/513,750 dated Jan. 20, 2011.
Notice of Allowance from U.S. Appl. No. 11/513,750 dated May 5, 2011.
Notice of Allowance from U.S. Appl. No. 11/513,750 dated Oct. 12, 2011.
Office action from U.S. Appl. No. 12/064,697 dated Jun. 22, 2011.
Amendment with Terminal Disclaimer from U.S. Appl. No. 12/064,697 dated Sep. 22, 2011.
Notice of Allowance from U.S. Appl. No. 12/064,697 dated Nov. 23, 2011.
Office action from U.S. Appl. No. 13/228,677 dated Feb. 2, 2012.
Amendment from U.S. Appl. No. 13/228,677 dated May 2, 2012.
Supplemental Amendment from U.S. Appl. No. 13/228,677 dated May 30, 2012.
Examiner Initiated Interview Summary from U.S. Appl. No. 13/228,677 dated Jun. 5, 2012.
Notice of Allowance from U.S. Appl. No. 13/228,677 dated Jun. 5, 2012.
Office Action for U.S. Appl. No. 13/301,051 dated May 9, 2013.
Amendment to Office Action for U.S. Appl. No. 13/301,051 dated Aug. 9, 2013.
Final Office Action for U.S. Appl. No. 13/301,051 dated Aug. 29, 2013.
Response from U.S. Appl. No. 13/301,051 dated Oct. 28, 2013.
Advisory Action from U.S. Appl. No. 13/301,051 dated Nov. 7, 2013.
Non Final Office Action for U.S. Appl. No. 13/301,061 dated Jul. 19, 2013.
Response from U.S. Appl. No. 13/301,061 dated Oct. 21, 2013.
Office action from U.S. Appl. No. 13/301,061 dated Nov. 5, 2013.
Response from U.S. Appl. No. 13/301,061 dated Mar. 5, 2014.
Office action from U.S. Appl. No. 13/301,061 dated Mar. 27, 2014.
Response from U.S. Appl. No. 13/301,061 dated Jun. 26, 2014.
Office action from U.S. Appl. No. 13/301,061 dated Aug. 6, 2014.
Office Action for U.S. Appl. No. 13/311,140 dated Jan. 10, 2013.
Response to Office Action for U.S. Appl. No. 13/311,140 dated Apr. 10, 2013.
Notice of Allowance from U.S. Appl. No. 13/311,140 dated May 15, 2013.
Comments on Statement of Reasons for Allowance from U.S. Appl. No. 13/311,140 dated Aug. 13, 2013.
Notice of Allowance from U.S. Appl. No. 13/311,140 dated Mar. 31, 2014.
Office Action for U.S. Appl. No. 13/412,034 dated Mar. 19, 2013.
Response to Office Action for U.S. Appl. No. 13/412,034 dated Jun. 18, 2013.
Notice of Allowance from U.S. Appl. No. 13/412,034 dated Sep. 30, 2013.
Office Action from U.S. Appl. No. 13/430,011 dated Aug. 8, 2012.
Amendment with Terminal Disclaimer from U.S. Appl. No. 13/430,011 dated Dec. 7, 2012.
Notice of Allowance in U.S. Appl. No. 13/430,011 dated Jan. 9, 2013.
Corrected Notice of Allowability for U.S. Appl. No. 13/430,011 dated Feb. 19, 2013.
Asakawa et al., "Experiment on operating methods of an electric wheelchair for a system of detecting position and direction", Robotics and Biomimetics, ROBIO 2007, IEEE Int'l Conf on Digital Object Identifier, 10.1109/ROBIO.2007.4522345, pp. 1260-1265 (2007).
Barea, R., et al., "EOG guidance of a wheelchair using neural networks", Proceedings 15th Intl Conf. on Pattern Recognition, vol. 4, Digital Object Identifier 10.1109/ICPR.2000.903006, pp. 668-671, published 2000.
Cooper et al., "Analysis of position and isometric joysticks for powered wheelchair driving", Biomedical Engineering, IEEE Transactions on Digital Object Identifier, vol. 47, issue 7, 10.1109/10.846684, published 2000, pp. 902-910.
Jones et al., "Powered wheelchair driving performance using force- and position-sensing joysticks", Bioengineering Conference, Proceedings of the IEEE 24th Annual Northeast, Digital Object identifier, 10.1109/NEBC.1998.664901, pp. 130-132, published 1998.

(56) References Cited

OTHER PUBLICATIONS

Katsura et al., "Semiautonomous wheelchair based on quarry of environmental information", IEEE Translations on Industrial Electronics, vol. 53, issue 4, Digital Object Identifier 10.1109/TIE.2006.878294, pp. 1373-1382, published 2006.
Sasaki et al., "Development of a new adaptation system for a manual wheelchair based on human body function", MHS '07 International Symposium on Micro-NanoMechatronics and Human Science, Digital Object Identifier, 10.1109/MHS.2007.4420902, pp. 478-484, published 2007.
Seong-Pal Kang, "A hand gesture controlled semi-autonomous wheelchair", IEEE/RSJ Intl Conf on Intelligent Robots and Systems, Digital Object Identifier: 10.1109/IROS.2004.1389968, pp. 3565-3570, vol. 4, published 2004.
Tanimoto et al., "Measurement of wheelchair position for analyzing transfer motion for SCI patient", Imaging Systems and Techniques, IST '07, IEEE International Workshop on Digital Object Identifier, 10.1009/IST.2007.379605, pp. 1-6, published 2007.
Dynamic, Actuator Remote Control Module DX-ARCS Installation Manual, copyright Jun. 2004, 10 pgs.
Dynamic, DX Attendant Control Unit (ACU) Installation Manual, No. 60013, issue 4, Nov. 1998, 30 pgs.
Dynamic, DX Dolphin Remote (DX-Rem34) Installation Manual, No. 60025, issue 5, Jan. 1999, 69 pgs.
Dynamic, DX Power Module (PMB, PMB1, PMB2, PMB-S) Installation Manual, No. 63824, issue 2, Jul. 1998, 85 pgs.
Dynamic, DX Remote Joystick Module (RJM) Installation Manual, No. 60014, iss. 4, Apr. 1997, 13 pgs.
Dynamic, DX Two Actuator Module (TAM) Installation Manual, No. 60026, issue 5, Jul. 1998, 45 pgs.
Dynamic, DX-GB, The Complete Gearless Brushless DC Control System brochure, 2 pgs., date unknown.
Dynamic, DX-REMG90, DX-REMG90A, DX-REMG90T Master Remotes Installation Manual, GBK64048, issue 1, Jan. 2005, 61 pgs.
Electric Motors Reference Center by Machine Design, DC Motors, seven page printout dated Jul. 25, 2006 from http://www.electricmotors.machinedesign.com/guiEdits/Content/bdeee3//bdeee3_1 . . . .
Flash, New and Notable Product Design, p. 28 from Design News Oct. 10, 2005.
Infineon Technologies, "XC164CS 16-Bit Single-Chip Microcontroller", Data Sheet, V2.1, Jun. 2003, 71 pgs.
Int'l App. No. PCT/US06/33963, International Preliminary Report on Patentability, dated Mar. 4, 2008, 7 pages.
Int'l App. No. PCT/US06/33963, International Search Report, dated May 4, 2007, 3 pages.
Int'l App. No. PCT/US06/33963, Written Opinion of the International Searching Authority, dated May 4, 2007, 6 pages.
Int'l App. No. PCT/US06/33964, International Preliminary Report on Patentability, dated Mar. 4, 2008, 11 pages.
Int'l App. No. PCT/US06/33964, International Search Report, dated May 4, 2007, 3 pages.
Int'l App. No. PCT/US06/33964, Written Opinion of the International Searching Authority, dated May 4, 2007, 10 pages.
Int'l App. No. PCT/US06/33971, International Preliminary Report on Patentability, dated Mar. 4, 2008, 7 pages.
Int'l App. No. PCT/US06/33971, International Search Report, dated Mar. 9, 2007, 4 pages.
Int'l App. No. PCT/US06/33971, Written Opinion of the International Searching Authority, dated Mar. 9, 2007, 6 pages.
Int'l App. No. PCT/US06/33972, International Preliminary Report on Patentability, dated Mar. 4, 2008, 6 pages.
Int'l App. No. PCT/US06/33972, International Search Report, dated May 8, 2007, 2 pages.
Int'l App. No. PCT/US06/33972, Written Opinion of the International Searching Authority, dated May 8, 2007, 5 pages.
Int'l App. No. PCT/US06/33973, International Preliminary Report on Patentability, dated Mar. 4, 2008, 6 pages.
Int'l App. No. PCT/US06/33973, International Search Report, dated Mar. 16, 2007, 3 pages.
Int'l App. No. PCT/US06/33973, Written Opinion of the International Searching Authority, dated Mar. 16, 2007, 5 pages.
Int'l App. No. PCT/US06/33978, International Preliminary Report on Patentability, dated Mar. 4, 2008, 9 pages.
Int'l App. No. PCT/US06/33978, International Search Report, dated Jun. 5, 2007, 7 pages.
Int'l App. No. PCT/US06/33978, Invitation to Pay Additional Fees and Communication Relating to the Results of the Partial International Search, dated Apr. 5, 2007, 8 pages.
Int'l App. No. PCT/US06/33978, Written Opinion of the International Searching Authority, dated Jun. 5, 2007, 8 pages.
Int'l App. No. PCT/US06/33998, International Preliminary Report on Patentability, dated Mar. 4, 2008, 7 pages.
Int'l App. No. PCT/US06/33998, International Search Report, dated Mar. 9, 2007, 4 pages.
Int'l App. No. PCT/US06/33998, Written Opinion of the International Searching Authority, dated Mar. 9, 2007, 6 pages.
Int'l App. No. PCT/US06/34149, International Preliminary Report on Patentability, dated Mar. 4, 2008, 7 pages.
Int'l App. No. PCT/US06/34149, International Search Report, dated Jun. 8, 2007, 3 pages.
Int'l App. No. PCT/US06/34149, Written Opinion of the International Searching Authority, dated Jun. 8, 2007, 7 pages.
Invacare Corporation—Brochure—"Invacare Tarsys Series Powered Seating Systems", Form No. 00-313, rev. Sep. 2002, 16 pgs.
Invacare Corporation—Brochure—"Storm Series Power Wheelchairs including Fomula CG Powered Seating, MK6i Electronics", 16 pgs., 2006, Form No. 06-040.
Invacare Corporation—Brochure "Invacare Storm Series TDX Power Wheelchairs, including Formula Powered Seating", Form No. 03-018, rev. Jul. 2004, 32 pgs.
Invacare, Owner's Operator and Maintenance Manual, 3G Storm Series Wheelchair Bases, Arrow RWD, Torque SP RWD, Ranger X RWD, dated Jun. 30, 2006, 88 pgs., Part No. 1143151.
Invacare, Owner's Operator and Maintenance Manual, Formula, CG Powered Seating Tilt Only, 48 pgs., Part No. 1143155, dated Jun. 30, 2006.
Linak, Product Data Sheet, Actuator LA30, 8 pgs, Chapter 2.1, copyright May 2002.
Final action from Canadian Application No. 2,616,332 dated Sep. 14, 2015.
First Office Action in Canadian Application No. 2,615,087 dated Feb. 6, 2013.
Response to Office Action in Canadian Application No. 2,615,087 dated Aug. 6, 2013.
Office action from Canadian Application No. 2,615,087 dated Sep. 20, 2013.
Office Action from Canadian Application No. 2,858,951 dated Jan. 21, 2015.
Office Action in European Application No. 06802770.5 dated Jul. 1, 2013.
Response from European Application No. 06802770.5 dated Nov. 11, 2013.
First Office Action from EP Application No. 06813984.9 dated Apr. 24, 2012.
Response to First Office Action from EP Application No. 06813984.9 dated Oct. 18, 2012.
Office action from European Application No. 06813984.9 dated Apr. 25, 2013.
Response from European Application No. 06813984.9 dated Nov. 4, 2013.
Office action from European Application No. 06813984.9 dated Apr. 30, 2014.
Response from European Application No. 06813984.9 dated Oct. 31, 2014.
Office action from European Application No. 06813991.4 dated Feb. 24, 2014.
Response from European Application No. 06813991.4 dated Aug. 21, 2014.
Second Office from European Application No. 06813991.4 dated Jan. 20, 2016.
Communication Pursuant to Article 94(3) EPC from European Application No. 06813991.4 dated Jul. 11, 2016.

(56) References Cited

OTHER PUBLICATIONS

First Office Action from European Application No. 06814005.2 dated Nov. 2, 2011.
Response from European Application No. 06814005.2 dated May 4, 2012.
2nd Office Action from European Appl. No. 06814005.2 dated May 21, 2013.
Office action from New Zealand Application No. 565,929 dated Oct. 8, 2009.
Response from New Zealand Application No. 565,929 dated Mar. 7, 2011.
Office action from New Zealand Application No. 565,929 dated Mar. 25, 2011.
Response from New Zealand Application No. 565,929 dated May 11, 2011.
Office action from New Zealand Application No. 565,930 dated Oct. 7, 2009.
Response from New Zealand Application No. 565,930 dated Feb. 22, 2011.
Office action from New Zealand Application No. 565,930 dated Mar. 10, 2011.
Response from New Zealand Application No. 565,930 dated May 5, 2011.
Office action from New Zealand Application No. 565,930 dated May 26, 2011.
Response from New Zealand Application No. 565,930 dated Jun. 24, 2011.
Office action from New Zealand Application No. 565,931 dated Oct. 8, 2009.
Response from New Zealand Application No. 565,931 dated Mar. 7, 2011.
Office action from New Zealand Application No. 565,931 dated Mar. 25, 2011.
Response from New Zealand Application No. 565,931 dated May 4, 2011.
Office action from New Zealand Application No. 565,932 dated Oct. 12, 2009.
Response from New Zealand Application No. 565,932 dated Mar. 21, 2011.
Office action from New Zealand Application No. 565,932 dated Mar. 29, 2011.
Response from New Zealand Application No. 565,932 dated May 13, 2011.
Office action from New Zealand Application No. 565,933 dated Sep. 28, 2009.
Response from New Zealand Application No. 565,933 dated Feb. 16, 2011.
Office action from New Zealand Application No. 565,933 dated Feb. 28, 2011.
Response from New Zealand Application No. 565,933 dated Apr. 18, 2011.
Office action from New Zealand Application No. 565,934 dated Oct. 12, 2009.
Response from New Zealand Application No. 565,934 dated Mar. 7, 2011.
Office action from New Zealand Application No. 565,934 dated Mar. 28, 2011.
Response from New Zealand Application No. 565,934 dated May 13, 2011.
Office action from New Zealand Application No. 565,935 dated Oct. 5, 2009.
Response from New Zealand Application No. 565,935 dated Feb. 4, 2011.
Office action from New Zealand Application No. 565,935 dated Feb. 18, 2011.
Response from New Zealand Application No. 565,935 dated Apr. 15, 2011.
Office Action from Canadian Application No. 2,931,730 dated Mar. 21, 2017.
Office action from New Zealand Application No. 591,829 dated Mar. 28, 2011.
Office action from New Zealand Application No. 591,831 dated Mar. 28, 2011.
Response to Office Action from New Zealand Application No. 591,831 dated Jul. 23, 2012.
Second Examination Report from New Zealand Application No. 591,831 dated Aug. 16, 2012.
Response to Office Action from New Zealand Appl. No. 591831 dated Nov. 12, 2012.
Office action from New Zealand Application No. 592,271 dated Apr. 20, 2011.
Office Action from New Zealand Application No. 592,271 dated Nov. 16, 2012.
Office action from New Zealand Application No. 592,317 dated Apr. 21, 2011.
Office Action from U.S. Appl. No. 13/412,034 dated Jul. 19, 2012.
Response to Election Requirement for U.S. Appl. No. 13/412,034 dated Nov. 19, 2012.
Office action from U.S. Appl. No. 13/412,034 dated Mar. 19, 2013.
Ex Parte Quayle Action for U.S. Appl. No. 13/646,989 dated Jun. 27, 2013.
Office action from U.S. Appl. No. 13/975,614 dated Apr. 30, 2014.
Notice of Allowance from U.S. Appl. No. 13/975,614 dated Dec. 10, 2014.
Office action from U.S. Appl. No. 14/027,970 dated May 16, 2014.
Response from U.S. Appl. No. 14/027,970 dated Aug. 18, 2014.
Notice of Allowance from U.S. Appl. No. 14/027,970 dated Oct. 28, 2014.
Office Action from U.S. Appl. No. 14/641,880 dated Nov. 18, 2015.
Amendment from U.S. Appl. No. 14/641,880 dated Mar. 18, 2016.
Quayle Action from U.S. Appl. No. 14/802,221 dated Apr. 28, 2016.
Notice of Allowance from U.S. Appl. No. 14/802,221 dated Aug. 10, 2016.
Notice of Allowance from Office Action from U.S. Appl. No. 14/641,880 dated May 25, 2016.
Office action from Australian Application No. 2006284687 dated Jul. 26, 2011.
Office action from Australian Application No. 2006284747 dated Jul. 1, 2011.
Response to Office Action from AU Application No. 2006284747 dated Feb. 26, 2013.
2nd Examination Report from AU Application No. 2006284747 dated Mar. 21, 2013.
Response to First Examiners Report from Australian application No. 2006284687 dated Dec. 19, 2012.
Exam Report from Australian Application No. 2006284748 dated Aug. 29, 2011.
Office action from Australian Application No. 2006284749 dated Apr. 28, 2011.
Response to Office Action from Australian Application No. 2006284749 dated Apr. 30, 2012.
Office action from Australian Application No. 2006284741 date May 9, 2011.
Response to Office Action from Australian Application No. 2006284741 dated May 17, 2012.
Office action from Australian Application No. 2006284753 dated Jul. 22, 2011.
Response to Office Action in AU Application No. 2006284753 dated Feb. 27, 2013.
Exam Report from Australian Application No. 2006284768 dated Aug. 24, 2011.
First Examiner's Report from Australia Patent Application No. 2009230795 dated Nov. 24, 2010.
Response from Australian Patent Application No. 2009230795 dated Nov. 30, 2011.
Exam Report from Australian Application No. 2013211496 dated Mar. 13, 2015.
Exam Report from Australian Application No. 2016201588 dated Nov. 10, 2016.
First Office Action in Canadian Application No. 2,614,744 dated Feb. 1, 2013.

(56) References Cited

OTHER PUBLICATIONS

Response to Office Action in Canadian Application No. 2,614,744 dated Aug. 1, 2013.
First Office Action from Canadian Application No. 2,615,084 dated Feb. 1, 2013.
Office action from Canadian Application No. 2,614,744 dated Nov. 19, 2013.
First Office Action from Canadian Application No. 2,614,752 dated Feb. 5, 2013.
First Office Action from Canadian Application No. 2,615,091 dated Jan. 30, 2013.
Amendment in Canadian Application No. 2,615,091 dated Jul. 30, 2013.
First Office Action in Canadian Application No. 2,616,325 dated Feb. 4, 2013.
Amendment in Canadian Application No. 2,616,325 dated Aug. 6, 2013.
Office action from Canadian Application No. 2,616,325 dated Nov. 22, 2013.
Response from Canadian Application No. 2,616,325 dated May 22, 2014.
Office action from Canadian Application No. 2,616,325 dated Jul. 14, 2014.
First Office Action in Canadian Application No. 2,616,332 dated Feb. 5, 2013.
Response to Office Action in CA Application No. 2,616,332 dated Aug. 6, 2013.
Office action from Canadian Application No. 2,616,332 dated Sep. 26, 2013.
Response from Canadian Application No. 2,616,332 dated Mar. 26, 2014.
Office action from Canadian Application No. 2,616,332 dated Sep. 23, 2014.
Response from Canadian Application No. 2,616,332 dated May 23, 2015.
Linak, Product Data Sheet, Actuator LA31, 8 pgs, Chapter 5.8.2, copyright May 2005.
MK5 Electronics Top 10 Application Features, 2005 Spring Update, 10 pgs (2005).
Paula, Taking sensors out of motors, Mechanical Engineering, The American Society of Mechanical Engineers, www.memagazine.org/backissues/january98/features/sensout/sensout.html, printed Aug. 16, 2006, 5 pgs (1998).
PG Drives Technology—R-Net Rehab-Powerchair Control System (Presentation), 30 pages, date unknown.
QR-ED Owners's Manual, Quickie Enhanced Display, Sunrise Medical, Inc., Longmont,Colorado, 10519 Rev. A, 2006 (51 pages).
Quantum Rehab Innovative Rehab Solutions, a division of Pride Mobility Products Corp., one page brochure, Q-Logic Drive Control System, QLOGIC—Mar. 13, 2006 (Mar. 13, 2006).
Quantum Rehab Innovative Rehab Solutions, a division of Pride Mobility Products Group, Q controls, page from http://www.pridemobility.com/quantum/Electronics/Q_Controls/q_controls.html, printed Jun. 9, 2006, copyright 1995-2006.
Quickie HHP Programming Tree, Sunrise Medical, Inc., Longmont, Colorado (7 pages) date unknown.
Service Manual, Quickie Rhythm & Groove, Sunrise Medical, Inc., Longmont, Colorado, 014061 Rev. A, 2006 (104 pages).
Specialty Control Set Up & Programming Guide, QR-SCM Owner's Manual, Quickie Electronics Platform powered by Delphi, Sunrise Medical, Inc., Longmont, Colorado, 101748 Rev. A, 2006 (15 pages).
Teknic, Inc., "The price/performance leader for OEM machine automation", Investigating Servo Architectures, 14 pgs. printed Aug. 15, 2006 from http://www.teknic.com/systems/, copyright 2006.
"ECU Fault Codes", 6 pgs, Revision 6, Aug. 5, 2002, retrieved from the Internet: www.topbuzz.com.uk/info/fault_codes/fault_codes.pdf.
"Errors: Linux System Errors", Nov. 18, 2004, 3 pgs, retrieved from the Internet: web.archive.org/web/20041118004818/http://www-numi.final.gov/offline_software/srt_public-context/WebDocs/Errors/unix_system_errors.html.
Office action from U.S. Appl. No. 11/513,740 dated Feb. 4, 2010.
Response from U.S. Appl. No. 11/513,740 dated Jul. 6, 2010.
Office action from U.S. Appl. No. 11/513,740 dated Oct. 4, 2010.
Response from U.S. Appl. No. 11/513,740 dated Feb. 4, 2011.
Office action from U.S. Appl. No. 11/513,740 dated Apr. 21, 2011.
Response from U.S. Appl. No. 11/513,740 dated Jul. 21, 2011.
Office action from U.S. Appl. No. 11/513,740 dated Oct. 18, 2011.
Applicant Initiated Interview Summary Action from U.S. Appl. No. 11/513,740 dated Jan. 27, 2012.
Statement of Substance of Interview from U.S. Appl. No. 11/513,740 dated Feb. 23, 2012.
Final Office Action from U.S. Appl. No. 11/513,740 dated Apr. 13, 2012.
Office action from U.S. Appl. No. 11/514,016 dated Feb. 22, 2010.
Response from U.S. Appl. No. 11/514,016 filed Jul. 21, 2010.
Notice of Allowance from U.S. Appl. No. 11/514,016 dated Sep. 30, 2010.
Comments on Statement of Reasons for Allowance from U.S. Appl. No. 11/514,016 dated Oct. 29, 2010.
Notice of Allowance from U.S. Appl. No. 11/514,016 dated Jan. 19, 2011.
Notice of Allowance from U.S. Appl. No. 11/514,016 dated May 5, 2011.
Response from U.S. Appl. No. 11/514,016 dated Aug. 4, 2011.
Notice of Allowance from U.S. Appl. No. 11/514,016 dated Sep. 12, 2011.
Office action from U.S. Appl. No. 11/513,854 dated Apr. 15, 2009.
Response from U.S. Appl. No. 11/513,854 dated Oct. 15, 2009.
Office action from U.S. Appl. No. 11/513,854 dated Feb. 3, 2010.
Response from U.S. Appl. No. 11/513,854 dated Aug. 3, 2010.
Notice of Allowance from U.S. Appl. No. 11/513,854 dated Jul. 18, 2011.
Notice of Allowance from U.S. Appl. No. 11/513,854 dated Oct. 4, 2011.
Notice of Allowance and Fees Due with Notice of Allowability from U.S. Appl. No. 11/511,606, 5 pages, dated May 8, 2008.
Response to Office action from U.S. Appl. No. 11/511,606 dated Jan. 8, 2008.
Office Action from U.S. Appl. No. 11/511,606, 5 pages, dated Sep. 13, 2007.
Response to Office action from U.S. Appl. No. 11/511,606 dated Aug. 24, 2007.
Final Office Action from U.S. Appl. No. 11/511,606, 5 pages, dated Jun. 7, 2007.
Response to Office action from U.S. Appl. No. 11/511,606 dated Mar. 21, 2007.
Non-final Office Action from U.S. Appl. No. 11/511,606, 4 pages, dated Dec. 21, 2006.
Office action from U.S. Appl. No. 11/513,780 dated Jan. 27, 2011.
Response from U.S. Appl. No. 11/513,780 dated Apr. 27, 2011.
Office action from U.S. Appl. No. 11/513,780 dated Aug. 2, 2011.
Response with RCE from U.S. Appl. No. 11/513,780 dated Feb. 2, 2012.
Office Action from U.S. Appl. No. 11/513,780 dated Mar. 30, 2012.
Non-final Office Action from U.S. Appl. No. 11/513,746, 7 pages, dated Jun. 26, 2008.

* cited by examiner

300

|  | DRIVE 1 (D1) | DRIVE 2 (D2) | DRIVE 3 (D3) | DRIVE 4 (D4) |
|---|---|---|---|---|
|  | Speed | Speed | Speed | Speed |
|  | Response | Response | Response | Response |
|  | Torque | Torque | Torque | Torque |
|  | Power Level | Power Level | Power Level | Power Level |
|  | • • • | • • • | • • • | • • • |
| ACTUATOR |  |  |  |  |
| Tilt | 0/90 | 0/90 | 0/90 | 0/90 |
| Recline | 0/90 | 0/90 | 0/90 | 0/90 |
| Right Leg | 0/90 | 0/90 | 0/90 | 0/90 |
| Left Leg | 0/90 | 0/90 | 0/90 | 0/90 |
| Dual Legs | 0/90 | 0/90 | 0/90 | 0/90 |
|  | • • • | • • • | • • • | • • • |
| Actuator$_N$ | Parameter$_{N\text{-}D1}$ | Parameter$_{N\text{-}D2}$ | Parameter$_{N\text{-}D3}$ | Parameter$_{N\text{-}D4}$ |

FIG. 3

| | DRIVE 1 (D1) | DRIVE 2 (D2) | DRIVE 3 (D3) | DRIVE 4 (D4) |
|---|---|---|---|---|
| | Speed | Speed | Speed | Speed |
| | Response | Response | Response | Response |
| | Torque | Torque | Torque | Torque |
| | Power Level | Power Level | Power Level | Power Level |
| | ● | ● | ● | ● |
| | ● | ● | ● | ● |
| ACTUATOR | ● | ● | ● | ● |
| Tilt | 10 | 12 | 10 | 10 |
| Recline | 45 | 40 | 30 | 10 |
| Right Leg | 15 | 15 | 14 | 10 |
| Left Leg | 15 | 15 | 14 | 10 |
| Dual Legs | 15 | 15 | 16 | 10 |
| | ● | ● | ● | ● |
| | ● | ● | ● | ● |
| | ● | ● | ● | ● |
| Actuator$_N$ | Parameter$_{N-D1}$ | Parameter$_{N-D2}$ | Parameter$_{N-D3}$ | Parameter$_{N-D4}$ |

| ACTUATOR | DRIVE 1 (D1) |
|---|---|
| | • • • |
| Tilt$_{UP}$ | 502 |
| Tilt$_{DOWN}$ | 504 |
| Recline$_{UP}$ | 506 |
| Recline$_{DOWN}$ | 508 |
| Right Leg$_{UP}$ | 514 |
| Right Leg$_{DOWN}$ | 516 |
| Left Leg$_{UP}$ | 518 |
| Left Leg$_{DOWN}$ | 520 |
| Dual Legs$_{UP}$ | 522 |
| Dual Legs$_{DOWN}$ | 524 |
| • • • | • • • |
| Actuator$_N$ | Parameter$_{N-D1}$ |

242 — Tilt$_{UP}$, Tilt$_{DOWN}$
244 — Recline$_{UP}$, Recline$_{DOWN}$
248 — Right Leg$_{UP}$, Right Leg$_{DOWN}$
250 — Left Leg$_{UP}$, Left Leg$_{DOWN}$
252 — Dual Legs$_{UP}$, Dual Legs$_{DOWN}$

FIG. 5

| | DRIVE 1 (D1) |
|---|---|
| | ⋮ |
| 1110 — Sequence No. | 01 |
| 242 — Tilt | 10 — 1132 |
| 244 — Recline | 10 — 1134 |
| 252 — Dual Legs | 10 — 1136 |
| 1120 — Sequence No. | 02 |
| 242 — Tilt | 20 — 1138 |
| 248 — Right Leg | 20 — 1142 |
| 250 — Left Leg | 30 — 1144 |
| 1130 — Sequence No. | 03 |
| 252 — Dual Legs | 0 — 1146 |
| 244 — Recline | 60 — 1150 |
| ⋮ | ⋮ |
| Sequence No. | N |

FIG. 11

METHOD AND APPARATUS FOR AUTOMATED POSITIONING OF USER SUPPORT SURFACES IN POWER DRIVEN WHEELCHAIR

CROSS-REFERENCE TO RELATED APPLICATIONS

This application is a continuation of U.S. patent application Ser. No. 14/802,221, filed on Jul. 17, 2015, which is a continuation of U.S. patent application Ser. No. 13/975,614, filed on Aug. 26, 2013, now U.S. Pat. No. 9,084,705, which is a continuation of U.S. patent application Ser. No. 13/646,989, filed on Oct. 8, 2012, now abandoned, which is a continuation of U.S. patent application Ser. No. 13/228,677, filed on Sep. 9, 2011, now U.S. Pat. No. 8,285,440, which is a divisional of U.S. patent application Ser. No. 11/513,750, filed on Aug. 31, 2006, now U.S. Pat. No. 8,073,585, which claims the benefit of eight U.S. provisional patent applications, including Ser. No. 60/712,987, filed Aug. 31, 2005, Ser. No. 60/727,005, filed Oct. 15, 2005, Ser. No. 60/726,983, filed Oct. 15, 2005, Ser. No. 60/726,666, filed Oct. 15, 2005, Ser. No. 60/726,981, filed Oct. 15, 2005, Ser. No. 60/726,993, filed Oct. 15, 2005, Ser. No. 60/727,249, filed Oct. 15, 2005, and Ser. No. 60/727,250, filed Oct. 15, 2005. This application is also related to seven non-provisional U.S. patent applications filed on the same day, including Ser. No. 11/513,740, now abandoned, entitled "Mode Programmable Actuator Controller for Power Positioning Seat or Leg Support of a Wheelchair," Ser. No. 11/514,016, now U.S. Pat. No. 8,073,588, entitled "Method and Apparatus for Setting or Modifying Programmable Parameters in Power Driven Wheelchair," Ser. No. 11/511,606, now U.S. Pat. No. 7,403,844, entitled "Method and Apparatus for Programming Parameters of a Power Driven Wheelchair for a Plurality of Drive Settings," Ser. No. 11/513,780, now abandoned, entitled "Adjustable Mount for Controller of Power Driven Wheelchair," Ser. No. 11/513,746, now abandoned, entitled "Method and Apparatus for Automated Positioning of User Support Surfaces in Power Driven Wheelchair," Ser. No. 11/513,854, now U.S. Pat. No. 8,065,051, entitled "Context-Sensitive Help for Display Device Associated with a Power Driven Wheelchair," and Ser. No. 11/513,802, now U.S. Pat. No. 8,127,875, entitled "Power Driven Wheelchair." The contents of all above-identified patent application(s) and patent(s) are fully incorporated herein by reference.

BACKGROUND

It is well known that physically impaired individuals with such disabilities as spinal cord injury, muscular dystrophy, multiple sclerosis, cerebral palsy or arthritis need the assistance of a power driven wheelchair to be mobile. Power driven wheelchairs, which may be of the type manufactured by Invacare Corporation of Elyria, Ohio, for example, generally include right and left side drive wheels driven by a motor controller via respectively corresponding right and left side drive motors, all of which are disposed on the wheelchair. A user can control, for example, the speed and direction of movement of the wheelchair, by manipulating a controller.

Power driven wheelchairs are generally controlled by an electronic control system. An exemplary control system for power or motor driven wheelchairs is disclosed in U.S. Pat. No. 6,819,981, entitled "Method and Apparatus for Setting Speed/Response Performance Parameters of a Power Driven Wheelchair," issued Nov. 16, 2004, and assigned to the same assignee as the instant application, which patent is hereby incorporated by reference in its entirety.

Typically, the power driven wheelchairs have a plurality of drive settings corresponding to different types of operation of the wheelchair by the user. An exemplary wheelchair may include four drive settings which may be Drive 1 (D1) for indoor operation, Drive 2 (D2) for moderate outdoor operation, Drive 3 (D3) for special operation, and Drive 4 (D4) for ramps and curbs. For each drive setting, there are numerous performance and power seating parameters which are programmed into the control system to satisfy the operational capabilities of the individual user of the wheelchair. The programming task is normally conducted through a hand held programmer unit having an interactive display and coupled to the control system much as described in the above-referenced U.S. Pat. No. 6,819,981, for example.

Additionally, power driven wheelchairs generally include user support surfaces for supporting a user while in the wheelchair. For example, a seat mounted on the wheelchair forms a user support surface for the user to sit on. A seat back forms a user support surface for the user's back. A pair of arms and a pair of legs may be mounted on the wheelchair to form user support surfaces for the user's arms and legs, respectively.

The position of these user support surfaces can be adjusted to increase the user's comfort. For example, by manually moving the aforementioned controller, the user can adjust the angle of the seat back relative to the seat based on the user's preference. The user must, however, continue to manipulate the controller to place a user support surface in a position desired by the user. Furthermore, the user must again manipulate the controller when changing the user support surface from one position to another. Additionally, the user is required to remember, or rediscover each time, the ideal position of the user support surfaces for performing a particular task. Thus, changing the position of the user support surfaces is often time-consuming and inconvenient to the user.

SUMMARY

In an exemplary aspect, a system and method are provided for programming automatic positioning (AP) information for a user support surface of a wheelchair.

According to another exemplary aspect, a system and method are provided for automating the positioning of a support surface of a wheelchair.

According to yet another exemplary aspect, a system and method are provided for programming automatic sequence positioning (ASP) information for sequentially positioning a plurality of user support surfaces of a wheelchair.

According to another exemplary aspect, a system and method are provided for automatically changing the positioning of a specified sequence of user support surfaces of a wheelchair.

According to still another exemplary aspect, a system and method are provided for programming automatic sequence positioning series (ASPS) information for a specified series of positioning sequences of user support surfaces of a wheelchair.

According to another exemplary aspect, a system and method are provided for automatically changing the positioning of a specified series of sequences of user support surfaces of a wheelchair. It is an additional exemplary aspect to automatically change the positioning of user support surfaces of a wheelchair according to a specified series of positioning sequences, wherein the sequences are separated by a predetermined period of time and user confirmation is required between the sequences.

BRIEF DESCRIPTION OF THE DRAWINGS

The above aspects and additional aspects, features and advantages will become more apparent by describing in detail exemplary embodiments thereof with reference to the attached drawings, in which:

FIG. 3 is a schematic diagram illustrating exemplary actuator parameters residing in a memory for different drive settings;

FIG. 4 is a schematic diagram illustrating additional exemplary actuator parameters residing in a memory for different drive settings;

FIG. 5 is a schematic diagram illustrating multiple exemplary position parameters residing in a memory for respective actuators;

FIG. 11 is a schematic diagram illustrating sequences of position parameters for a drive setting, as stored in a memory, according to an exemplary embodiment;

DETAILED DESCRIPTION OF EXEMPLARY EMBODIMENTS

As described herein, the adjustment of user support surfaces (e.g., a seat, an armrest, etc.) of a power driven wheelchair is simplified and enhanced. Data representing a desired position of a user support surface is stored in advance. Thereafter, through a simple action (e.g., moving a joystick in a particular direction, such as pressing the joystick to its "up" position), the user can cause the data to be retrieved and used to automatically move the corresponding user support surface to the position defined by the data.

Figure 1:
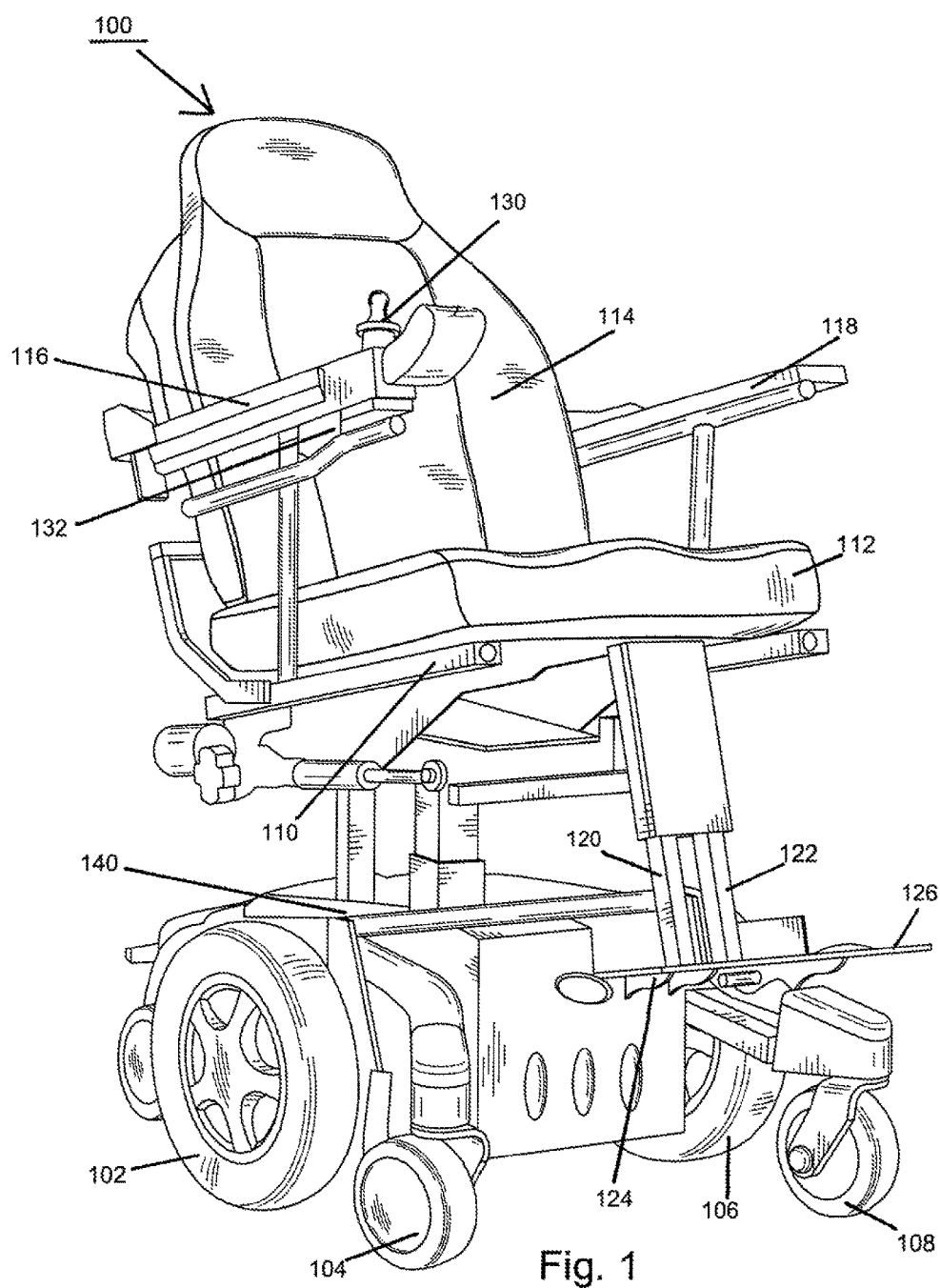
FIG. 1 is a perspective view of a power driven wheelchair, applicable to exemplary embodiments.

An exemplary power driven wheelchair is illustrated in FIG. 1. Referring to FIG. 1, the power driven wheelchair 100 includes a right wheel 102, a right caster 104, a left wheel 106 and a left caster 108. The wheels and casters are connected to a chassis 140 of the wheelchair. The wheelchair may be powered by one or more batteries, D.C. current or any other alternative power source, which is capable of operating the wheelchair. An optional battery compartment (not shown) for housing one or more batteries can be provided in the chassis 140, but any other element can be used to locate the batteries on the wheelchair. Any type of motor or motors (not shown) can be employed to drive one or more wheels of the wheelchair. Examples of such motors commonly used in the art can be classified as d.c. gear motors, brushless gear motors, or brushless gearless motors. Different types of wheel drives, for example, front-wheel drive, mid-wheel-drive, rear-wheel drive, all-wheel drive, or four-wheel drive, can also be used.

The wheelchair 100 generally includes a seat frame 110 upon which a seat 112 is mounted. The seat includes a seat back 114. Additionally, the wheelchair may include a right arm 116, a left arm 118, a right leg 120, and a left leg 122. The arms 116, 118 and the legs 120, 122 may be connected to the seat frame 110. The right leg 120 and the left leg 122 may include a right footrest 124 and a left footrest 126, respectively. The footrests 124, 126 may be formed so as to move independently of the respective legs 120, 122.

Each of the seat 112, the seat back 114, the right arm 116, the left arm 118, the right leg 120, the left leg 122, the right footrest 124 and the left footrest 126 forms a user support surface capable of supporting some portion of a user's body. For example, the right arm 116 forms a user support surface upon which a user may place his or her right arm.

The wheelchair 100 may further include a controller 130 for controlling, for example, the speed and direction of movement of the wheelchair 100. The controller 130 may be mounted on the wheelchair 100 via a mounting assembly 132. In the exemplary embodiment of FIG. 1, the controller 130 is a joystick. However, other types of controllers of can be used. For example, touchpad controllers, sip and puff controllers, headset controllers, etc. (not shown) can be used to control operation of the wheelchair 100.

Additionally, the controller 130 (or some other control mechanism mounted to the wheelchair 100) can be used to cause an actuator to move one or more of the aforementioned user support surfaces. A user support surface may be operable to move in one or more directions via one or more actuators.

With regard to the exemplary power driven wheelchair 100, illustrated in FIG. 1, it should be appreciated that different designs and embodiments, such as wheel sizes and locations may be utilized and the drawing is merely an example of one type of wheelchair to which the embodiments may be applied.

Figure 2:
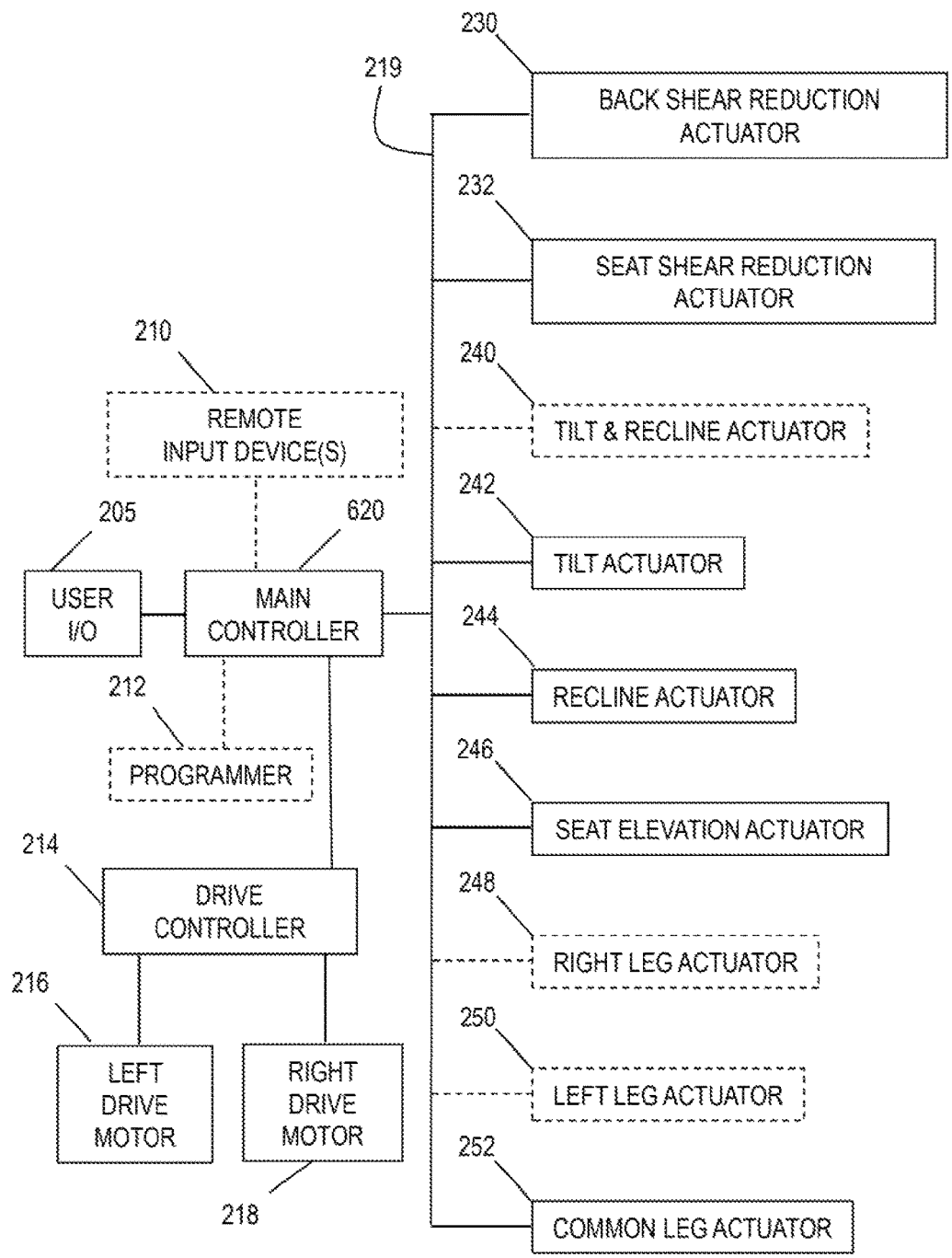
FIG. 2 is a schematic diagram illustrating a plurality of actuators connected to a controller of a power driven wheelchair, according to an exemplary embodiment.
Figure 6:
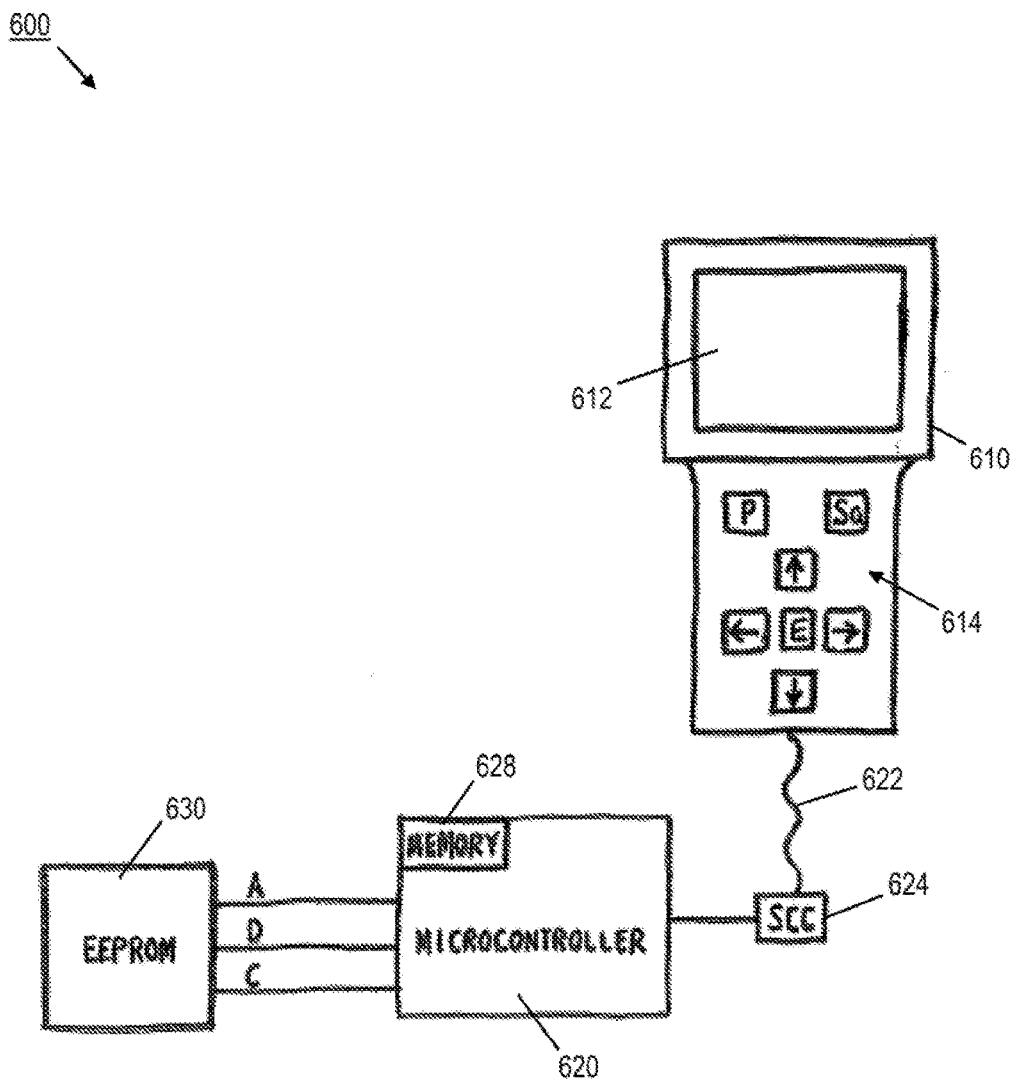
FIG. 6 is a schematic diagram illustrating a programming device connected to a control system of a power driven wheelchair, according to an exemplary embodiment.

As shown in FIG. 2, actuators are provided for controlling movement of the various user support surfaces, in response to signals received from a main controller 620 (also shown in FIG. 6). The main controller 620 may communicate with one or more actuators via a wired (e.g., a bus) or wireless (e.g., RF) connection 219. The main controller 620 may also communicate with a drive controller 214 to allow a user to control movement of the wheelchair 100. The drive controller 214 controls, for example, a left drive motor 216 and a right drive motor 218. Additionally, the main controller 620 may interface with other devices, for example, a remote input device 210 and a programmer device 212.

The user operates the power driven wheelchair 100 by user input and output (I/O) 205. The user I/O 205 may include, for example, joystick controller 130 mounted on the wheelchair 100. The user I/O 205 may also include a display screen integrated with the joystick controller 130, or a separate display device mounted on the wheelchair 100. Movement of the joystick controller 130 produces signals that are sent to the main controller 620 for further processing, e.g., to specify a drive direction of the wheelchair 100 or to move an actuator corresponding to a user support surface of the wheelchair 100. Additionally, various operational parameters may be displayed on the user I/O 205. For example, a current drive setting, an actuator being moved, etc. may be displayed on the user I/O 205. The user I/O 205 also allows the user to interact with menus displayed on the user I/O 205 to facilitate operation of the wheelchair and movement of the user support surfaces thereto.

Referring to FIG. 2, a tilt actuator 242 controls movement of the seat 112 and seat back 114 rotating, for example, relative to the chassis 140 while maintaining a constant angle between the seat 112 and the seat back 114. A recline actuator 244 controls movement of the seat back 114, for example, relative to the seat 112. A seat elevation actuator 246 controls up and down movement of the seat 112, for example, relative to the chassis 140. A right leg actuator 248 and a left leg actuator 250 control movement of the right leg 120 and the left leg 122, respectively, for example, relative to the seat frame 110.

Furthermore, a single actuator might function to control movement of several user support surfaces. For example, a tilt and recline actuator 240 can function to control the tilt movement of the seat 112 and seat back 114 and the recline movement of the seat back 114. A common leg actuator 252 can be used to control movement of the right leg 120 and the left leg 122 in unison. It will be appreciated that additional actuators may be provided, as needed, to control additional user support surfaces. Other actuators may be used as well. For example, back shear reduction actuator 230 and seat shear reduction actuator 232 are provided to reduce the movement of the user relative to the user support surfaces (i.e., the shear) during movement of one or more of the user support surfaces.

Parameters for one or more of these actuators may be stored in memory as parameters under one or more drive settings of a drive control program. Alternatively, the parameters could be stored in memory independently of any drive settings or drive control program. According to an exemplary implementation, as shown in FIG. 3, four drive settings (D1 310, D2 320, D3 330 and D4 340) corresponding to four different modes of operation of the wheelchair are stored in memory 300 (e.g., non-volatile memory of a control system 600 of the wheelchair, such as EEPROM 630 of FIG. 6).

The drive control program includes drive control parameters, such as speed 312, response 314, torque 316 and power level 318, for each of the drive settings. A drive control parameter may or may not differ from one drive setting to another. Additional parameters may be stored under the different drive settings. For example, as shown in FIG. 3, minimum and maximum position values are stored for various actuators. These values represent a minimum position (e.g., minimum angle) and a maximum position (e.g., maximum angle) for each actuator under each drive setting. Alternatively, the minimum and maximum position values may be stored elsewhere or hardwired for the system.

By way of illustration, parameters 350 limit the tilt actuator 242 to a movement range of 0 to 90 degrees for drive settings D1, D2, D3 and D4; parameters 352 limit the recline actuator 244 to a movement range of 0 to 90 degrees for drive settings D1, D2, D3 and D4; parameters 356 limit the right leg actuator 248 to a movement range of 0 to 90 degrees for drive settings D1, D2, D3 and D4; parameters 358 limit the left leg actuator 250 to a movement range of 0 to 90 degrees for drive settings D1, D2, D3 and D4; and parameters 360 limit the common leg actuator 252 to a movement range of 0 to 90 degrees for drive settings D1, D2, D3 and D4. Other actuators, such as the seat elevation actuator 246, may have parameters expressed other than in degrees (e.g., in inches) to limit a movement range of the actuator. These actuator limits may be fixed, as they are often based on hardware considerations. Additionally, the parameters corresponding to a movement range of a particular actuator need not be the same for each drive setting.

According to an exemplary embodiment, a system for automating the positioning of a user support surface of a wheelchair is provided. In the system, additional parameters are associated with each actuator. Each of these parameters indicates a position to which the particular actuator is to move for the corresponding drive setting.

For example, as shown in FIG. 4, drive setting D1 310 includes position parameters 402, 404, 408, 410 and 412; drive setting D2 320 includes position parameters 414, 416, 420, 422 and 424; drive setting D3 330 includes position parameters 426, 428, 432, 434 and 436; and drive setting D4 340 includes position parameters 438, 440, 444, 446 and 448, which correspond to the tilt actuator 242, the recline actuator 244, the right leg actuator 248, the left leg actuator 250 and the common leg actuator 252, respectively, for each drive setting. By way of illustration, for drive setting D2 320, position parameter 416 indicates that the recline actuator 244 is to move to a position corresponding to an angle of 40 degrees. Movement of recline actuator 244 to such a position would cause the user support surface defined by the seat back 114 to move accordingly. These position parameters function as preset positions for the various user support surfaces, across the various drive settings. Accordingly, a user can cause a user support surface of the wheelchair to automatically move to a preset position by entering an appropriate command (e.g., by manipulating the joystick controller 130), which results in the actuator or actuators corresponding to the user support surface moving to a predefined position indicated by the position parameter associated with the command and the current drive setting.

Additionally, as shown in FIG. 5, multiple position parameters may be defined for the same actuators in the same drive setting. For simplicity, only drive setting D1 310 is shown. In FIG. 5, up-angle position parameters 502, 506, 514, 518 and 522, which correspond to the tilt actuator 242, the recline actuator 244, the right leg actuator 248, the left leg actuator 250 and the common leg actuator 252, respectively, are associated with a left-drive command, e.g., moving the joystick left while the wheelchair is in an appropriate mode. Down-angle position parameters 504, 508, 516, 520 and 524, which correspond to the tilt actuator 242, the recline actuator 244, the right leg actuator 248, the left leg actuator 250 and the common leg actuator 252, respectively, are conversely associated with a right-drive command, e.g., moving the joystick right while the wheelchair is in an appropriate mode.

Accordingly, as described below, a user can enter the appropriate command to initiate the corresponding automatic positioning. For example, if the user enters the right-drive command, one or more selected actuators associated with the right-drive command are automatically positioned based on previously stored position parameters.

Next, setup of the position parameters will be described with reference to FIGS. 5 and 6. Preferably, but not necessarily, a technician (or other qualified individual) will ensure that the actuators to be programmed are properly installed and functioning. Using a programming device (e.g., programmer 212 in FIG. 2), the technician will then proceed to program the up-angle position parameter (e.g., parameter 502) and the down-angle position parameter (e.g., parameter 504) for an actuator (e.g., tilt actuator 242) and a drive setting (e.g., D1 310). The technician can continue to program parameters for other actuators and other drive settings.

Programming of the parameters may be carried out in accordance with the method and apparatus disclosed in U.S. Non-Provisional patent application Ser. No. 11/511,606, entitled METHOD AND APPARATUS FOR PROGRAMMING PARAMETERS OF A POWER DRIVEN WHEELCHAIR FOR A PLURALITY OF DRIVE SETTINGS and filed on Aug. 29, 2006, now U.S. Pat. No. 7,403,844, which is incorporated herein by reference in its entirety.

An exemplary programming device is illustrated in FIG. 6. As shown in FIG. 6, an external, hand held programmer unit 610 may be coupled to a control system 600 of the power driven wheelchair 100 and comprises a display screen 612 which may be a liquid crystal display (LCD), for example, and a plurality of pushbuttons 614 for use in selecting the desired drive setting and actuator and entering the position parameter settings, like up-angle and down-angle position values, for example, by interacting with the image on the display screen 612 as will become better understood from the description below. More specifically, the pushbuttons 614 may include a Power I/O (P), Save (Sa), Enter (E), left arrow, right arrow, up arrow and down arrow pushbuttons.

In the present exemplary embodiment, the remote programmer unit 610 communicates with a main controller 620 of the control system 600 via serially coded signals over lines 622. The main controller 620 may include a programmed microcontroller. The serial lines 622 may be coupled to the microcontroller 620 through a serial communication controller (SCC) 624. The tasks of the SCC 624 include setting the protocol, performing serial/parallel translations, checking for errors in transmission, and managing the traffic for the serial communication between the remote programmer unit 610 and the main controller 620.

The microcontroller 620 may include an internal memory 628 which may be of the random access (RAM) or scratch pad type, for example, and is coupled to an electrically erasable programmable read only memory (EEPROM) 630 over address (A), data (D) and control (C) lines. While the memory 628 is shown internal to the microcontroller 620, it is understood that a portion or all of the memory 628 may just as well be external to the microcontroller 620. Generally, when powered up, the controller 620 will boot up under program control and may access the preset parameters and relationships stored in the EEPROM 630 and store them temporarily to the scratch pad memory 628 for interaction with the remote programmer unit 610 and operation of the wheelchair. It is understood that when power is removed, the stored data of the RAM 628 will be lost. The EEPROM 630, however, will retain the data of its memory without power. Other non-volatile memory may be used in addition to or instead of EEPROM, such as various removable non-volatile memory (e.g., SD, CF, MS, etc.) coupled via an appropriate connector.

Figure 7:
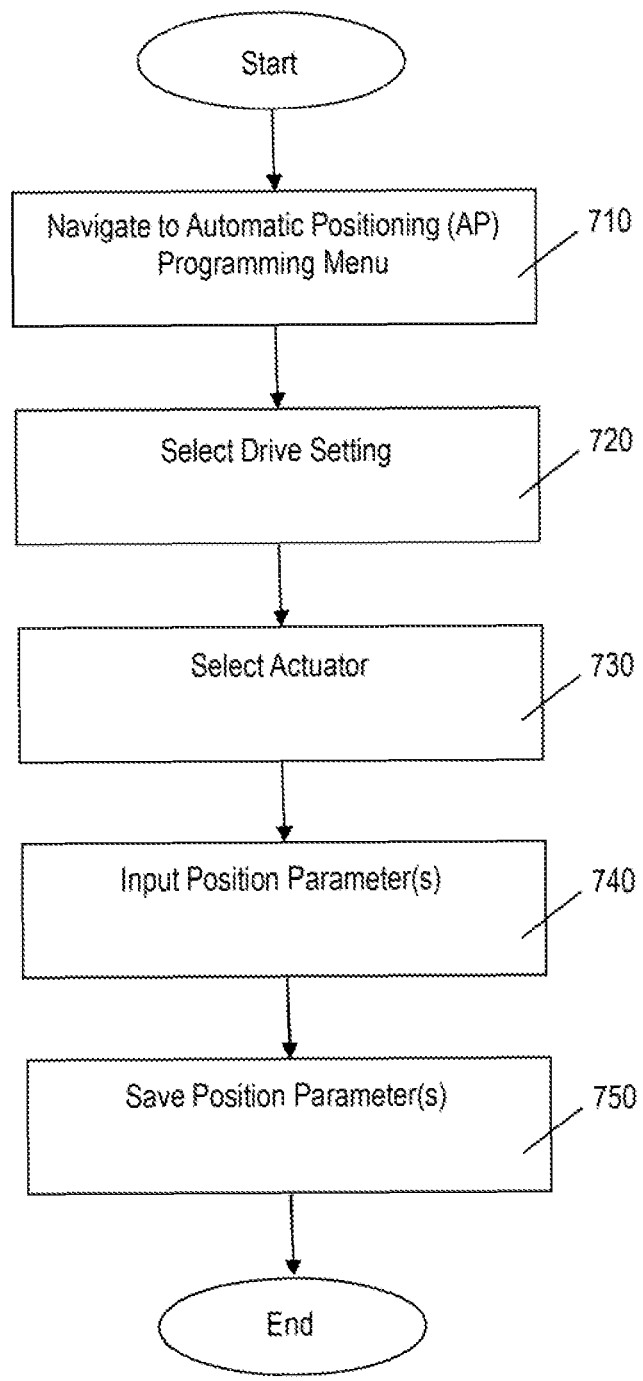
FIG. 7 is a flowchart illustrating a method of programming position parameters into a memory, according to an exemplary embodiment.

As indicated above, the microcontroller 620 is programmed to interact with the remote programmer unit 610 via signal lines 622 and SCC 624 for entry of the parameter values or settings and for the display thereof. The flowchart of FIG. 7 illustrates a method of programming position parameters for automatic positioning (AP) into a memory (e.g., EEPROM 630), using a programming device (e.g., programmer unit 610), to automate the positioning of user support surfaces of a wheelchair, according to an exemplary embodiment. The steps illustrated in FIG. 7 need not necessarily be performed in the order shown.

In FIG. 7, once the programmer unit 610 is connected to the control system 600 of a wheelchair, the technician navigates to the appropriate menu (i.e., an AP programming menu) for programming the position parameters, in step 710. Menus and other navigational aids (textual and/or graphical) may be displayed on the display screen 612 of the programmer unit 610. From the menu, the technician selects the drive setting to be programmed, in step 720.

Then, the technician selects the device (i.e., a specific actuator), associated with the selected drive setting, to be programmed, in step 730. For example, a list of available actuators may be displayed on the display screen 612, so that the technician can select the actuator from the displayed list. The selected actuator may be capable of accepting a plurality of position parameters, for example, up-angle and down-angle position parameters. In this case, step 730 may further include selecting a parameter number to program. Optionally, the different parameter numbers are associated with different commands. For example, the up-angle position parameter for an actuator may be associated with a left-drive command, so that the user can initiate automatic positioning of the actuator according to the up-angle position parameter by inputting the left-drive command. Similarly, the down-angle position parameter for an actuator may be associated with a right-drive command, so that the user can initiate automatic positioning of the actuator according to the down-angle position parameter by inputting the right-drive command.

Optionally, if the different parameter numbers are associated with different commands, the parameter numbers (and/or the parameter values) may be displayed on a display screen of the controller 130 or a separate display device, along with information on a command for initiating automatic positioning for each of the different parameter numbers. The information on a command may be abbreviated, iconic, etc. For example, displaying a left arrow on the display screen of the controller 130 or the separate display device next to a parameter number of 02 could be used to inform the user that a left-drive command has been associated with the position parameter numbered 02 for the selected actuator.

Figure 8A:
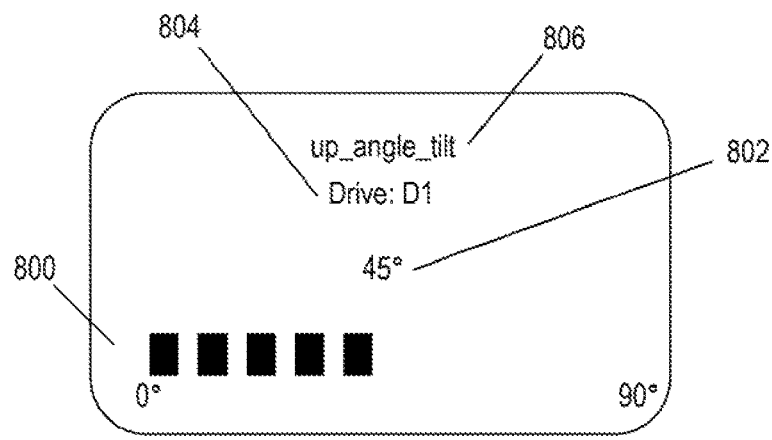
FIGS. 8A-8C are schematic diagrams illustrating a graphic interface for inputting parameter values, according to an exemplary embodiment.
Figure 8B:
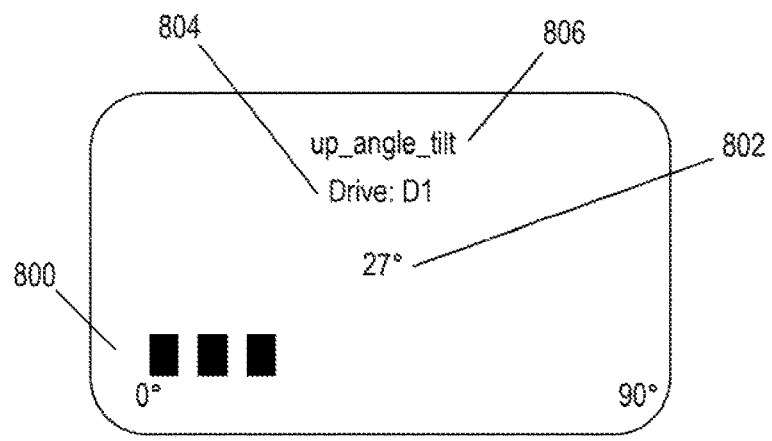
Figure 8C:
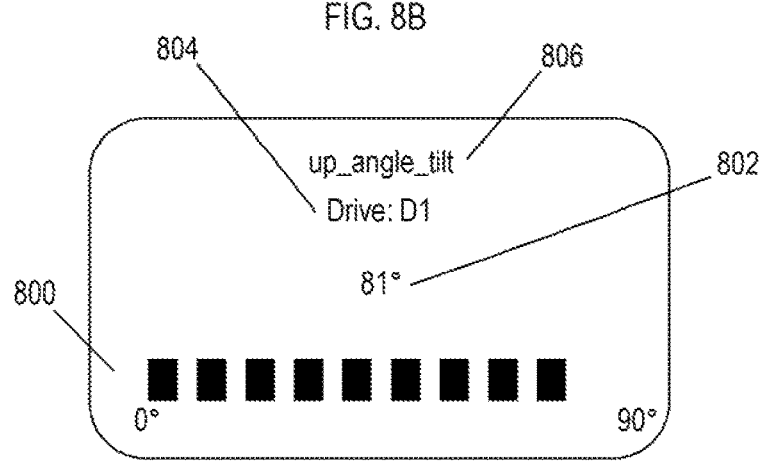

In step 740, the technician inputs the parameter value for the selected actuator. For inputting the parameter value, a graphic bar 800, as shown in FIGS. 8A-8C, may be displayed on the display screen 612 of the programmer unit 610. The numerical range associated with the graphic bar 800 may correspond to the numerical range of valid values for the parameter. In FIGS. 8A-8C, the graphic bar 80 represents the numerical range of 0 degrees to 90 degrees. As shown in FIG. 8A, the graphic bar 800, for example, initially displays the current value of the parameter to be programmed or a default value 802, here 45 degrees. Additional information may be displayed on the display screen 612, such as the drive setting 804 selected in step 720 and the actuator/parameter 806 to be programmed selected in step 730. More or less information may be displayed depending, for example, on a size of the display screen 612.

By manipulating the pushbuttons 614, the technician may decrease the parameter from the default value 802 (e.g., 45 degrees) to a desired lower value (e.g., 27 degrees), as illustrated in FIG. 8B, or increase the default value 802 (e.g., 45 degrees) to a desired higher value (e.g., 81 degrees), as illustrated in FIG. 8C. As one example, the programmer unit 610 and the main controller 620 cooperate so the technician can push the left arrow pushbutton to decrease the parameter value and the right arrow pushbutton to increase the parameter value.

In step 750, once the desired value is input for the position parameter, the position parameter is saved. As one example, the technician can push the Sa (save) pushbutton on the programmer unit 610 to save the input parameter value to memory. Preferably, but not necessarily, the input parameter value is stored in non-volatile memory. By repeating the steps shown in FIG. 7, the technician can save position values for the various actuators, spanning a plurality of drive settings.

It will be appreciated that devices other than the external programmer unit 610 could be used to program the position parameters. As one example, a touchpad controller used to control movement of the wheelchair could also be used to program the position parameters. In such a case, it may be desirable to require some form of authentication prior to programming in order to prevent unauthorized individuals from performing the programming.

It will further be appreciated that a plurality of position parameters can be programmed for each of the actuators. Accordingly, the position parameters optionally may be the same for each of the drive settings. As an example, if an actuator (e.g., recline actuator 244) is programmed to store 4 different position values, these position values are the same for each of the drive settings (e.g., D1 310, D2 320, D3 330 and D4 340). In this manner, regardless of the drive setting that a user is currently operating in, the user could access the four different preset positions, without having to change drive settings.

Figure 9:
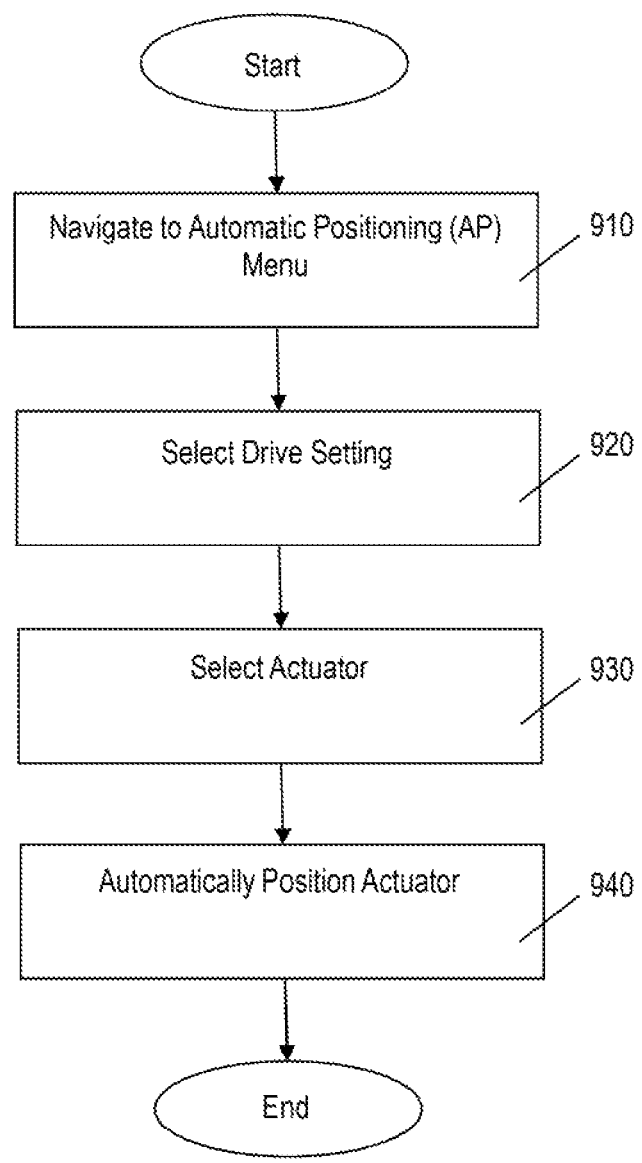
FIG. 9 is a flowchart illustrating a method of automatically moving a user support surface of a wheelchair to a predefined position, according to an exemplary embodiment.

Once position parameters have been programmed into the system (e.g., by a technician, as described above), a wheelchair user can access those parameters to cause a user support surface of the wheelchair to automatically move to the position corresponding to the position parameter. The flowchart of FIG. 9 illustrates a method of automatically positioning a user support surface of a wheelchair, according to an exemplary embodiment. The steps illustrated in FIG. 9 need not necessarily be performed in the order shown.

As shown in FIG. 9, the user of the wheelchair navigates to an automatic positioning (AP) menu, in step 910. The user navigates to the AP menu using a controller 130 of the power driven wheelchair and, if the controller 130 does not have an integrated display screen, a separate display device. Menus and other navigational aids (textual and/or graphical) may be displayed on the display screen of controller 130 or the display device. From the menu, the user selects the drive setting having the desired preset position, in step 920. If the desired drive setting is already set, then this step can be omitted. Furthermore, it may be possible to set the drive setting without using the menu (e.g., through a switch).

Then, the user selects the actuator to be positioned automatically, in step 930. As a result, the selected actuator is automatically moved to the position corresponding to the previously programmed position parameter for the selected actuator and drive setting, in step 940. If different position parameters are associated with the selected actuator, the user may be required to select among the different positions using the controller 130 (e.g., by inputting a left drive command for a first parameter and a right drive command for a second parameter).

As one example, if the user selects the drive setting D3 330 and the recline actuator 244, in steps 920 and 930, then the recline actuator 244 is automatically moved to the preset position corresponding to the recline actuator 244 and drive setting D3 330, which results in the seat back 114 being automatically positioned to the previously programmed position. In this manner, the user is able to position a user support surface of a power driven wheelchair easily, accurately and consistently.

Figure 10:
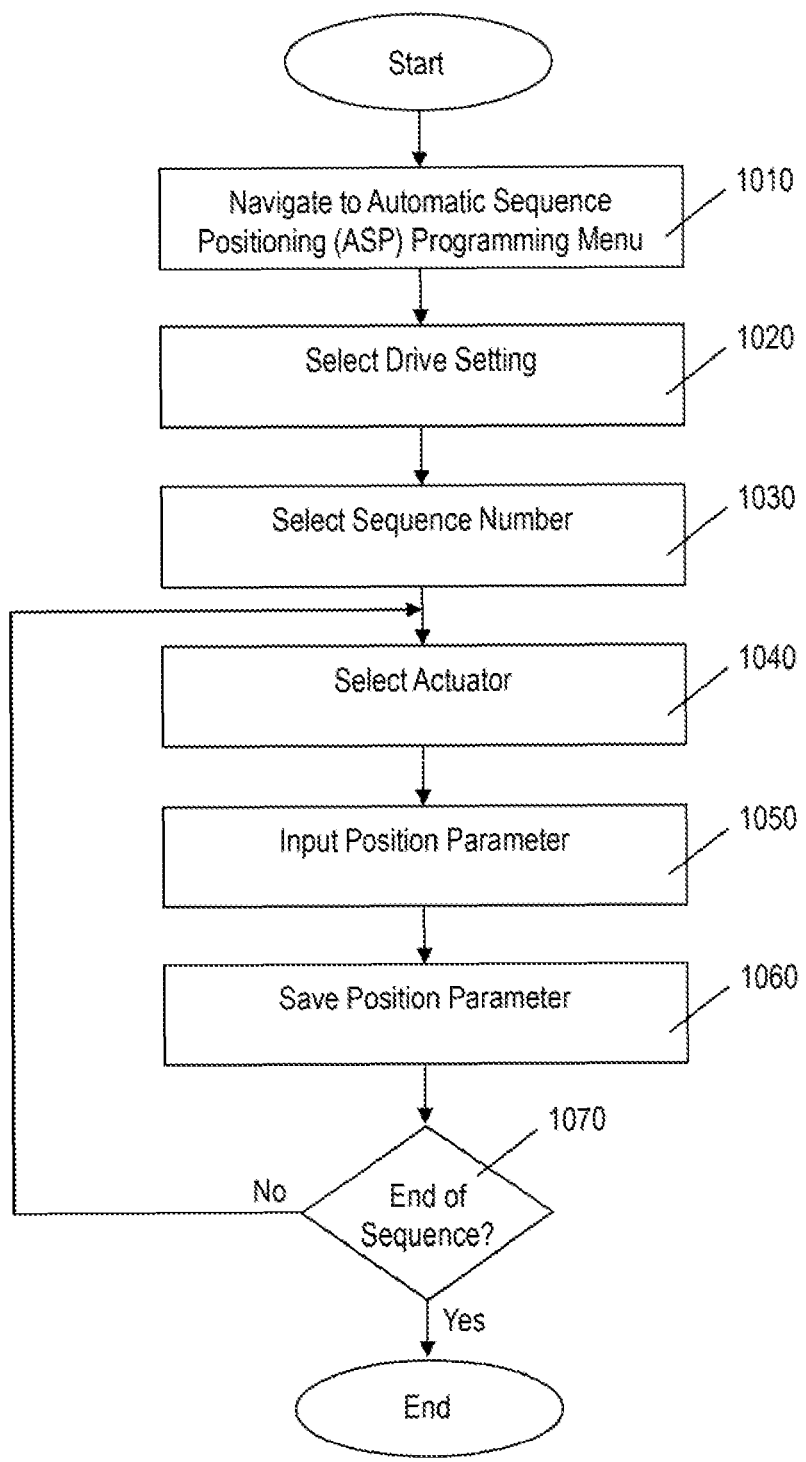
FIG. 10 is a flowchart illustrating a method of programming a sequence of position parameters into a memory, according to an exemplary embodiment.

The flowchart of FIG. 10 illustrates a method of programming position parameters for automatic sequence positioning (ASP) into a memory (e.g., EEPROM 630), using a programming device (e.g., programmer unit 610), to automate the positioning of a sequence of user support surfaces of a wheelchair, according to an exemplary embodiment. The steps illustrated in FIG. 10 need not necessarily be performed in the order shown.

In FIG. 10, once the programmer unit 610 is connected to the control system 600 of a wheelchair, a technician navigates to the appropriate menu (i.e., an ASP programming menu) for programming the sequence of position parameters, in step 1010. Menus and other navigational aids (textual and/or graphical) may be displayed on the display screen 612 of the programmer unit 610. From the menu, the technician selects the drive setting to be programmed, in step 1020. Preferably, but not necessarily, multiple sequences can be programmed for each drive setting. In this case, the technician selects the sequence number to be programmed for the selected drive setting, in step 1030. Otherwise, this step can be omitted. Each of the different sequences (e.g., sequence numbers) may be associated with a different command. For example, a first sequence may be associated with a left-drive command, so that the user can initiate automatic positioning of the actuators according to the first sequence by inputting the left-drive command. Similarly, a second sequence may be associated with a right-drive command, so that the user can initiate automatic positioning of the actuators according to the second sequence, by inputting the right-drive command. In another embodiment, only two sequences may be programmed for each drive setting, i.e., a sequence associated with a left-drive command and a sequence associated with a right-drive command.

Optionally, if the different sequence numbers are associated with different commands, the sequence numbers (and/or the parameter values for the sequence) may be displayed on a display screen of the controller 130 or a separate display device, along with information on a command for initiating automatic positioning for each of the different sequence numbers. The information on a command may be abbreviated, iconic, etc. For example, displaying a right arrow on the display screen of the controller 130 or the separate display device next to a sequence number of 03 could be used to inform the user that a right-drive command has been associated with the sequence numbered 03 for the selected drive setting.

Then, the technician selects a first device (i.e., a specific actuator) for the sequence to be programmed, in step 1040. For example, a list of available actuators may be displayed on the display screen 612, so that the technician can select the actuator from the displayed list. In step 1050, the technician uses the programmer unit 610 to input a parameter value for the selected actuator. As noted above, FIGS. 8A-8C illustrate and the accompanying text describes an exemplary technique for inputting parameter values. In step 1060, once the desired value is input for the position parameter, the position parameter is saved. As one example, the technician can push the Sa (save) pushbutton on the programmer unit 610 to save the input parameter value to memory. Preferably, but not necessarily, the input parameter value is stored in non-volatile memory.

Next, it is determined whether the technician is finished defining the sequence, in step 1070. For example, "Sequence finished?" may be displayed on the display screen 612 of the programmer unit, wherein the technician can use the pushbuttons 614 to indicate yes or no. If the technician indicates that the sequence is finished ("Yes" in step 1070), then programming of the automatic positioning sequence is ended.

If the technician indicates that the sequence is unfinished ("No" in step 1070), then the control flow returns to step 1040 and programming of the automatic positioning sequence continues. In this way, the technician can program multiple preset positions that are associated with one another and will occur in a specified sequence.

It will be appreciated that devices other than the external programmer unit 610 could be used to program the position parameters. As one example, a touchpad controller used to control movement of the wheelchair could also be used to program the position parameters. In such a case, it may be desirable to require some form of authentication prior to programming in order to prevent unauthorized individuals from performing the programming.

Since a plurality of sequences can be programmed for each of the drive settings, the sequences optionally may be the same for each of the drive settings. As an example, if four different sequences are programmed for drive setting D1 310, then the same four sequences are programmed for drive settings D2 320, D3 330 and D4 340. In this manner, regardless of the drive setting that a user is currently operating in, the user could access the four different sequences, without having to change drive settings.

FIG. 11 is a diagram illustrating exemplary sequences of position parameters for a drive setting D1 310, as stored in a memory (e.g., EEPROM 630). As shown in FIG. 11, a sequence includes a sequence number and position parameters for a sequence of actuators.

For example, in FIG. 11, a first sequence 1110 has sequence number 01 and includes position values 1132, 1134 and 1136 for the sequential positioning of actuators 242, 244 and 252, respectively. A second sequence 1120 has sequence number 02 and includes position values 1138, 1142 and 1144 for the sequential positioning of actuators 242, 248 and 250, respectively. A third sequence 1130 has sequence number 03 and includes position values 1146 and 1150 for the sequential positioning of actuators 252 and 244, respectively.

These different sequences may correspond to different positions of the user support surfaces of the wheelchair for different purposes. For example, the first sequence 1110 may correspond to a position of the seat 112, the seat back 114 and the legs 120, 122, which facilitates loading of the wheelchair into a van. The second sequence 1120 may correspond to a position of the seat 112, the seat back 114 and the legs 120, 122, which facilitates transfer of the user from the wheelchair to his or her bed. The third sequence 1130 may correspond to a position of the seat 112, the seat back 114 and the legs 120, 122, which facilitates transfer of the user from the wheelchair to a car seat.

Figure 12:
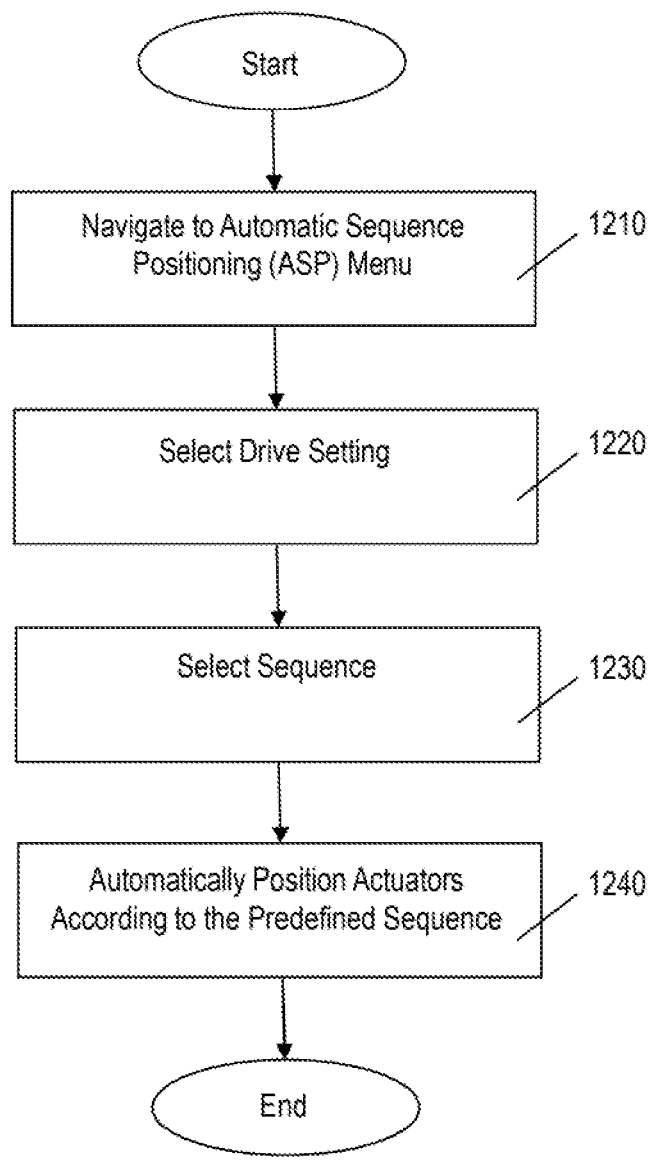
FIG. 12 is a flowchart illustrating a method of automatically positioning user support surfaces of a wheelchair in a predefined sequence, according to an exemplary embodiment.

Once a sequence has been programmed into the system (e.g., by a technician, as described above), a wheelchair user can access the sequence to cause user support surfaces of the wheelchair to automatically move to the positions corresponding to the position parameters defined in the sequence. The flowchart of FIG. 12 illustrates a method of automatically positioning user support surfaces of a wheelchair in a predefined sequence, according to an exemplary embodiment. The steps illustrated in FIG. 12 need not necessarily be performed in the order shown.

As shown in FIG. 12, the user of the wheelchair navigates to an automatic sequence positioning (ASP) menu, in step 1210. The user navigates to the ASP menu using a controller 130 of the power driven wheelchair and, if the controller 130 does not have an integrated display screen, a separate display device. Menus and other navigational aids (textual and/or graphical) may be displayed on the display screen of controller 130 or the display device. From the menu, the user selects the drive setting having the desired preset sequence, in step 1220. If the desired drive setting is already set, then this step can be skipped. Furthermore, it may be possible to set the drive setting without using the menu (e.g., through a switch).

Then, the user selects the sequence to be activated, in step 1230. As a result, the selected sequence begins executing, in step 1240. Specifically, the first actuator in the sequence is automatically moved to the position corresponding to the previously programmed position parameter for this actuator in the selected sequence and drive setting. Once the first actuator in the sequence is moved to the preset position, the next actuator in the sequence is automatically moved to the position corresponding to the previously programmed position parameter for this actuator in the selected sequence and drive setting. This process repeats for each actuator in the sequence until all of the actuators have been moved to their respective final preset positions, thus ending the sequence. In this manner, the user is able to position the various user support surfaces of a power drive wheelchair easily, accurately and consistently.

Figure 13:
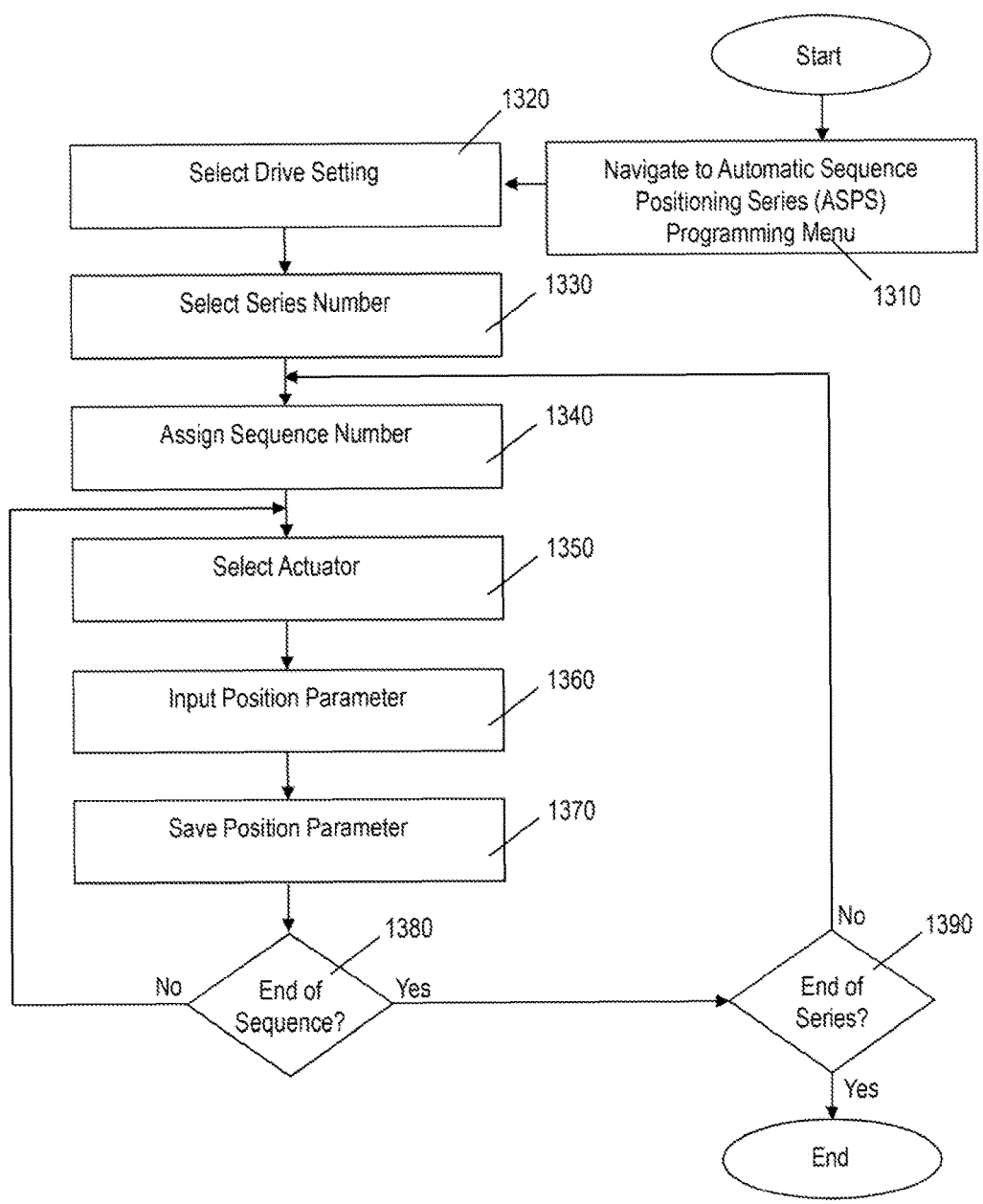
FIG. 13 is a flowchart illustrating a method of programming position parameters for an automatic sequence positioning series (ASPS) into a memory, according to an exemplary embodiment.

The flowchart of FIG. 13 illustrates a method of programming position parameters for an automatic sequence positioning series (ASPS) into a memory (e.g., EEPROM 630), using a programming device (e.g., programmer unit 610), to automate the positioning of a series of sequences of user support surfaces of a wheelchair, according to an exemplary embodiment. The steps illustrated in FIG. 13 need not necessarily be performed in the order shown.

In FIG. 13, once the programmer unit 610 is connected to the control system 600 of a wheelchair, a technician navigates to the appropriate menu (i.e., an ASPS programming menu) for programming the series of sequences of position parameters, in step 1310. Menus and other navigational aids (textual and/or graphical) may be displayed on the display screen 612 of the programmer unit 610. From the menu, the technician selects the drive setting to be programmed, in step 1320. Preferably, but not necessarily, multiple series can be programmed for each drive setting. In this case, the technician selects the series number to be programmed for the selected drive setting, in step 1330. Otherwise, this step can be omitted.

Next, a first sequence number is assigned for the series being programmed. As one example, a variable value representing a sequence counter can be reset to 0 in step 1330 and incremented by 1 in step 1340. In this manner, each time step 1340 is performed, the sequence counter will be incremented by 1.

After the first sequence of the series is assigned sequence number 1 in step 1340, the technician selects a first device (i.e., a specific actuator) for the sequence to be programmed, in step 1350. For example, a list of available actuators may be displayed on the display screen 612, so that the technician can select the actuator from the displayed list. In step 1360, the technician uses the programmer unit 610 to input a parameter value for the selected actuator. As noted above, FIGS. 8A-8C illustrate and the accompanying text describes an exemplary technique for inputting parameter values. In step 1370, once the desired value is input for the position parameter, the position parameter is saved. As one example, the technician can push the Sa (save) pushbutton on the programmer unit 610 to save the input parameter value.

Next, it is determined whether the technician is finished defining the sequence, in step 1380. For example, "Sequence finished?" may be displayed on the display screen 612 of the programmer unit, wherein the technician can use the pushbuttons 614 to indicate yes or no. If the technician indicates that the sequence is unfinished ("No" in step 1380), then the control flow returns to step 1350 and programming of the sequence continues. In this way, the technician can program multiple preset positions that are associated with one another and will occur in a specified sequence.

If the technician indicates that the sequence is finished ("Yes" in step 1380), then the control flow goes to step 1390. In step 1390, it is determined whether the technician is finished defining the series (of sequences). For example, "Series finished?" may be displayed on the display screen 612 of the programmer unit, wherein the technician can use the pushbuttons 614 to indicate yes or no.

If the technician indicates that the series is finished ("Yes" in step 1390), then the programming of the automatic positioning sequence series is ended. If the technician indicates that the series is unfinished ("No" in step 1390), then the control flow returns to step 1340, wherein a new sequence number is assigned to the next sequence in the series, and programming of the series continues.

Figure 14:
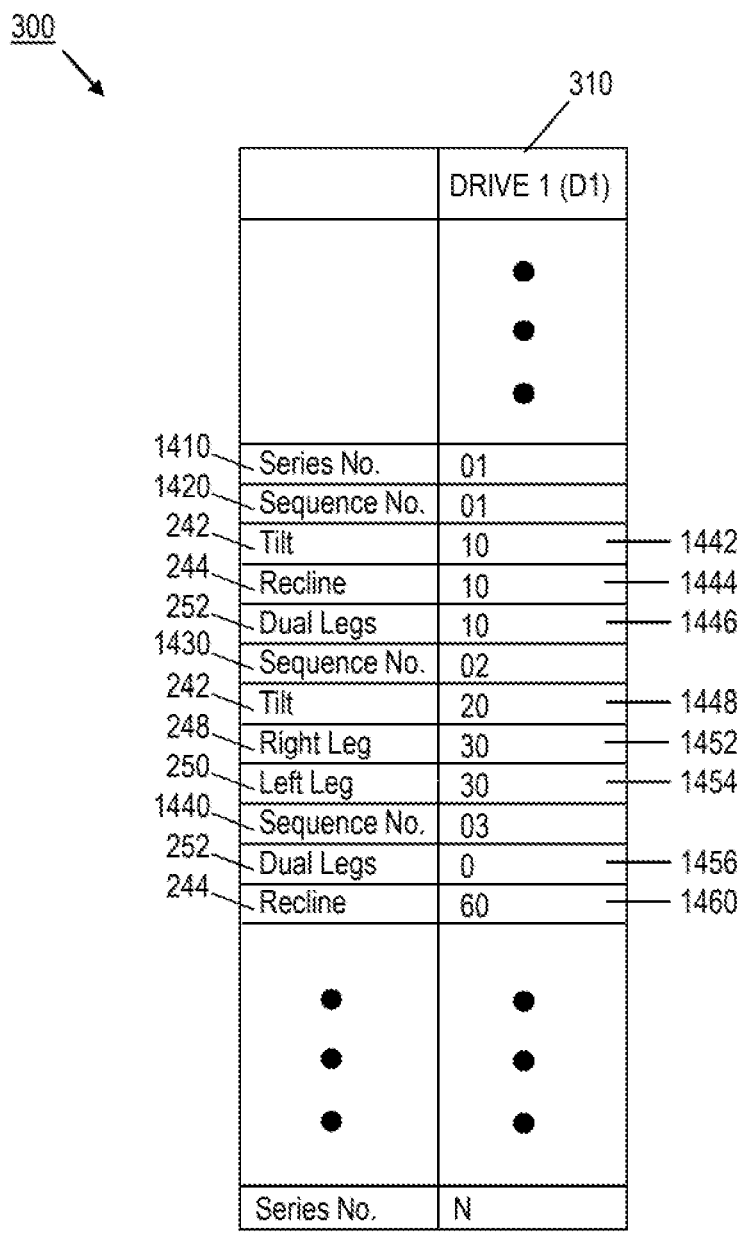
FIG. 14 is a schematic diagram illustrating a series of sequences of position parameters for a drive setting stored, as stored in a memory, according to an exemplary embodiment.

FIG. 14 is a diagram illustrating an exemplary series of sequences of position parameters for a drive setting D1 310, as stored in a memory (e.g., EEPROM 630). As shown in FIG. 14, a series includes a series number and one or more sequences, wherein each sequence includes a sequence number and position parameters for a sequence of actuators.

For example, in FIG. 14, a first series 1410 has series number 01 and includes three sequences 1420, 1430 and 1440. In the series 1410, a first sequence 1420 has sequence number 01 and includes position values 1442, 1444 and 1446 for the sequential positioning of actuators 242, 244 and 252, respectively. A second sequence 1430 has sequence number 02 and includes position values 1448, 1452 and 1454 for the sequential positioning of actuators 242, 248 and 250, respectively. A third sequence 1440 has sequence number 03 and includes position values 1456 and 1460 for the sequential positioning of actuators 252 and 244, respectively.

Figure 15:
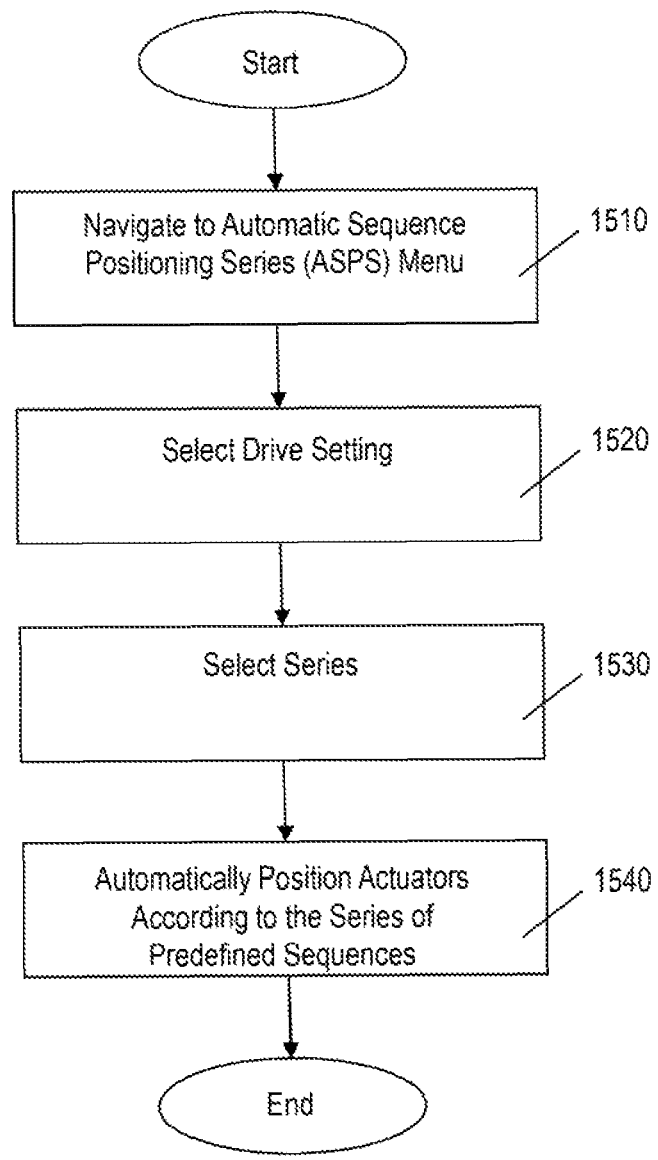
FIG. 15 is a flowchart illustrating a method of automatically positioning user support surfaces of a wheelchair through a series of predefined sequences, according to an exemplary embodiment.

Once a series of sequences has been programmed into the system (e.g., by a technician, as described above), a wheelchair user can access the series to cause user support surfaces of the wheelchair to automatically move to the positions corresponding to the position parameters defined in the series of sequences. The flowchart of FIG. 15 illustrates a method of automatically positioning user support surfaces of a wheelchair through a series of predefined sequences, according to an exemplary embodiment. The steps illustrated in FIG. 15 need not necessarily be performed in the order shown.

As shown in FIG. 15, the user of the wheelchair navigates to an automatic sequence positioning series (ASPS) menu, in step 1510. The user navigates to the ASPS menu using a controller 130 of the power driven wheelchair and, if the controller 130 does not have an integrated display screen, a separate display device. Menus and other navigational aids (textual and/or graphical) may be displayed on the display screen of controller 130 or the display device. From the menu, the user selects the drive setting having the desired preset series, in step 1520. If the desired drive setting is already set, then this step can be skipped. Furthermore, it may be possible to set the drive setting without using the menu (e.g., through a switch).

Then, the user selects the series to be activated, in step 1530. If the desired series if already set or if a drive setting is limited to a single series, then this step can be skipped. As a result, the selected series begins executing, in step 1540. Specifically, for each sequence in the series, the actuators are sequentially moved to the positions corresponding to the previously programmed position parameters for the sequence. Once a first sequence completes, the next sequence in the series begins automatically. This process repeats for each sequence in the series until all of the sequences have completed, thus ending the series. In this manner, the user is readily able to initiate an automatic series of different positions of the various user support surfaces of a power drive wheelchair.

In another exemplary embodiment, the different sequences, comprising a series, may correspond to different positions of the user support surfaces of the wheelchair for therapeutic purposes. In particular, different positions prescribed to the user may be carried out by automatically positioning the user support surfaces of the wheelchair. For example, a first sequence may include automatically elevating the legs of the wheelchair to a predetermined position (e.g., to address a lower-extremity circulation issue of the user).

Figure 16:
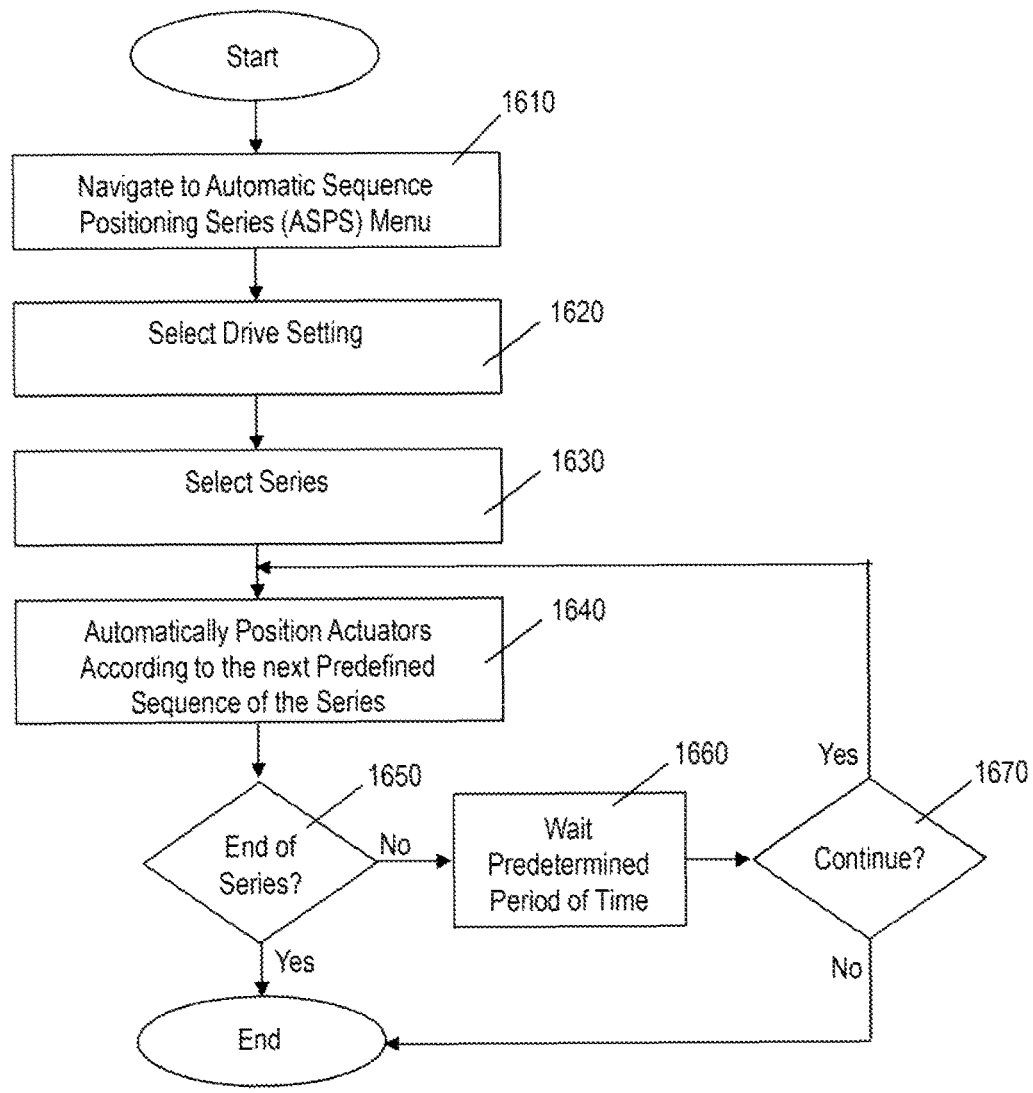
FIG. 16 is a flowchart illustrating a method of automatically positioning user support surfaces of a wheelchair through a series of predefined sequences, according to another exemplary embodiment.

In this exemplary embodiment, the ASPS parameters are used to periodically reposition the user support surfaces of the wheelchair automatically. In particular, the flowchart of FIG. 16 illustrates a method of automatically positioning user support surfaces of a wheelchair through a series of predefined sequences, upon receiving user confirmation before beginning each sequence in the series. The steps illustrated in FIG. 16 need not necessarily be performed in the order shown.

As shown in FIG. 16, the user of the wheelchair navigates to an automatic sequence positioning series (ASPS) menu, in step 1610. The user navigates to the ASPS menu using a controller 130 of the power driven wheelchair and, if the controller 130 does not have an integrated display screen, a separate display device. Menus and other navigational aids (textual and/or graphical) may be displayed on the display screen of controller 130 or the display device. From the menu, the user selects the drive setting having the desired preset series, in step 1620. If the desired drive setting is already set, then this step can be omitted. Furthermore, it may be possible to set the drive setting without using the menu (e.g., through a switch).

Then, the user selects the series to be activated, in step 1630. If the desired series is already set or if a drive setting is limited to a single series, then this step can be skipped. As a result, a first sequence in the series begins executing, in step 1640. Specifically, the actuators are sequentially moved to the positions corresponding to the previously programmed position parameters for the sequence. Once the first sequence completes, it is determined whether the series has ended, in step 1650.

If it is determined in step 1650 that the series has ended, the automated positioning of the user support surfaces of the wheelchair ends. Otherwise, the method waits for a predetermined period of time, represented by step 1660, for example, 30 minutes. Preferably, but not necessarily, the predetermined period of time is a parameter set by the technician when programming the series (see FIG. 13).

After the predetermined period of time has passed, represented by step 1660, the user is prompted to confirm that he or she wishes to continue with the automated positioning of the user support surfaces of the wheelchair, i.e., whether the user wishes for the next sequence in the series to be executed, in step 1670. For example, "Continue?" may be displayed on a display screen of the controller 130 or a separate display device, wherein the user can use the controller 130 (or other input device) to indicate yes or no.

If the user indicates that he or she does not wish to continue with the series ("No" in step 1670), then the automated positioning of the user support surfaces of the wheelchair ends.

Otherwise, if the user indicates that he or she wishes to continue with the series ("Yes" in step 1670), then the control flow returns to step 1640, wherein a next sequence in the series begins executing. Specifically, the actuators are sequentially moved to the positions corresponding to the previously programmed position parameters for the sequence. The following processing (steps 1650, 1660 and 1670) is the same as described above and repeats until the series had ended or the user no longer wishes to continue to a next sequence in the series.

In this manner, the user is able to initiate a series of positions for the user support surfaces of the wheelchair. Each positioning of the user support surfaces (i.e., each sequence) is performed automatically and separated by a predetermined period of time. Optionally, the period of time between different sequences in a series can vary. Preferably, but not necessarily, user confirmation is required between each sequence or before each sequence begins. The different sequences in the series and the time interval between the sequences can be programmed to correspond to a prescribed routine, which may result in health benefits such as improved circulation, a reduced likelihood of bedsores, etc.

As an example, a series could be programmed for a user with a history of bedsores to reduce the likelihood of the user developing further bedsores. In general terms, a bedsore is an ulceration of tissue deprived of adequate blood supply by prolonged pressure. Upon initiation of the series by the user (or caregiver), the position of the user supports surfaces of the wheelchair are automatically moved to a first position, according to a first sequence of the series. After a predetermined period of time (e.g., 1 hour) has passed, and upon receipt of confirmation via the controller from the user to continue, the user support surfaces of the wheelchair are automatically moved to a second position, according to a second sequence of the series. If each sequence in the series is programmed to redistribute the user's weight in the wheelchair with respect to the user support surfaces, prolonged pressure on any one part of the user's body can be avoided, such that the likelihood of the user developing a bedsore is reduced.

Exemplary embodiments have been provided herein for purposes of illustration and are not intended to in any way be limiting. Indeed, additional advantages and modifications will readily appear to those skilled in the art. For example, the automatic positioning of actuators according to a sequence of position parameters can include positioning more than one actuator at a time. Accordingly, such departures may be made from the exemplary embodiments without departing from the spirit or scope of the applicants' general concept.

Furthermore, it will be clear to those of ordinary skill in the art that all of the methods described herein and set forth in the claims, as well as any and all combinations and permutations of the steps thereof, may be implemented in the form of and/or in combination with a power driven wheelchair or a controller for a power driven wheelchair.

We claim:

1. A method of automating movement of user support surfaces of a power driven wheelchair to predefined positions, the method comprising:
    storing data representing a first set of predetermined positions of a plurality of user support surfaces of the power driven wheelchair in a non-volatile memory;
    storing data representing a first sequence that defines a first order for moving the plurality of user support surfaces to the first set of predetermined positions in the non-volatile memory;
    associating the data with a first user input, wherein activation of the first user input causes the plurality of user support surfaces to automatically move to the first set of predetermined positions according to the first order defined by the first sequence.

2. The method of claim 1, further comprising:
    storing data representing a second set of predetermined positions of the plurality of user support surfaces of the power driven wheelchair in the non-volatile memory;
    storing data representing a second sequence that defines a second order for moving the plurality of user support surfaces to the second set of predetermined positions in the non-volatile memory;
    associating the data with a second user input, wherein activation of the second user input causes the plurality of user support surfaces to automatically move to the second set of predetermined positions according to the second order defined by the second sequence.

3. The method of claim 2, wherein the first user input comprises a left command and the second user input comprises a right command within the same drive setting.

4. The method of claim 2, wherein the first order is different than the second order.

5. The method of claim 1, further comprising:
    storing data representing a second set of predetermined positions of the plurality of user support surfaces of the power driven wheelchair in the non-volatile memory;
    storing data representing a second sequence that defines a second order for moving the plurality of user support surfaces to the second set of predetermined positions in the non-volatile memory;
    associating the first sequence and the second sequence with a series, wherein activation of the first user input causes the plurality of user support surfaces to automatically move to the first set of predetermined positions according to the first order defined by the first sequence, then move to the second set of predetermined positions according to the second order defined by the second sequence.

6. The method of claim 5, further comprising waiting a predetermined period of time between moving the plurality of user support surfaces to the first set of predetermined positions according to the first order defined by the first sequence and moving the plurality of user support surfaces to the second set of predetermined positions according to the second order defined by the second sequence.

7. The method of claim 5, further comprising waiting for a user input between moving the plurality of user support surfaces to the first set of predetermined positions according to the first order defined by the first sequence and moving the plurality of user support surfaces to the second set of predetermined positions according to the second order defined by the second sequence.

8. The method of claim 5, wherein the power driven wheelchair stores a plurality of series, and wherein a plurality of series are associated with at least one of the plurality of drive settings.

9. The method of claim 1, further comprising associating the first sequence data with a drive setting of the power driven wheelchair.

10. The method of claim 1, wherein the power driven wheelchair comprises a plurality of drive settings, and wherein a plurality of sequences are associated with each of the plurality of drive settings.

11. The method of claim 1, wherein each of the plurality of sequences associated with one of the drive settings is associated with a different command for the user input.

12. The method of claim 1, wherein the first user input and the second user input are associated with an input device, and wherein successive activations of the input device initiate alternating activations of the first sequence and the second sequence.

13. The method of claim 1, wherein the predetermined position data and sequence data are input using a programming device which interfaces with a control system of the power driven wheelchair.

14. The method of claim 1, wherein the first user input is a drive command.

15. The method of claim 1, wherein the first user input is a remote input device.

16. A programmer for programming automated movement of user support surfaces of the power driven wheelchair to predefined positions according to the method of claim 1, comprising:
  a display screen; and
  inputs for selecting parameters associated with the predefined positions and sequence;
  wherein the programmer is coupled to a controller of the power driven wheelchair during programming.

17. A method of programming automated movement of user support surfaces of a power driven wheelchair to predefined positions, the method comprising:
  selecting each of a plurality of user support surfaces of the power driven wheelchair associated with a first position;
  inputting a first position parameter for each of the plurality of user support surfaces in a first order;
  saving the first position parameter for each of the plurality of user support surfaces;
  saving the first order; and
  associating the first position data and first order data with a first sequence, wherein execution of the first sequence causes the plurality of user support surfaces to automatically move to the first position according to the first order.

18. The method of claim 17, further comprising:
  selecting each of a plurality of user support surfaces of the power driven wheelchair associated with a second position;
  inputting a second position parameter for each of the plurality of user support surfaces in a second order;
  saving the second position parameter for each of the plurality of user support surfaces;
  saving the second order;
  associating the second position data and second order data with a second sequence; and
  associating the first sequence and the second sequence with a series, wherein execution of the series causes the plurality of user support surfaces to automatically move to the first position according to the first order, then move to the second position according to the second order.

19. The method of claim 1, wherein a plurality of actuators are associated with moving the plurality of user support surfaces.

20. The method of claim 1, wherein a single actuator controls movement of more than one user support surface.

21. The method of claim 1, wherein at least one actuator controls movement of the user during movement of one or more of the user support surfaces.

22. The method of claim 21, wherein the at least one actuator comprises a shear reduction actuator.

23. The method of claim 1, wherein automatically moving support surfaces according to the first sequence includes moving two support surfaces in unison.

24. The method of claim 1, wherein automatically moving support surfaces according to the first sequence includes moving more than one support surface at a time.

25. The method of claim 1, wherein the predetermined positions are within a range between a minimum position and a maximum position for each associated actuator.

26. The method of claim 1, wherein at least one of the predetermined positions comprises a minimum position or a maximum position for an associated actuator.

27. The method of claim 1, wherein at least one user support surface moves to a plurality of predetermined positions during the first sequence.

28. The method of claim 1, wherein the power drive wheelchair comprises a controller including the non-volatile memory, and wherein the controller is configured to control movement of the user support surfaces to the predetermined positions.

* * * * *